United States Patent [19]

Steenblik et al.

[11] Patent Number: 5,715,316
[45] Date of Patent: Feb. 3, 1998

[54] OPTICAL IMAGE ENCRYPTION AND DECRYPTION PROCESSES

[75] Inventors: Richard A. Steenblik, Stone Mountain; Mark J. Hurt, Lawrenceville, both of Ga.

[73] Assignee: Printpack, Inc., Roswell, Ga.

[21] Appl. No.: 141,807

[22] Filed: Oct. 25, 1993

Related U.S. Application Data

[63] Continuation of Ser. No. 788,226, Nov. 5, 1991, abandoned.

[51] Int. Cl.[6] ............................................. G09C 5/00
[52] U.S. Cl. .................. 380/54; 273/157 A; 359/618; 359/640
[58] Field of Search ..................... 380/54; 273/157 A; 359/618, 639, 567, 628, 640, 619

[56] References Cited

U.S. PATENT DOCUMENTS

| | | | |
|---|---|---|---|
| 3,084,453 | 4/1963 | Brown | 380/54 |
| 3,151,520 | 10/1964 | Nadeau | 380/54 |
| 3,166,625 | 1/1965 | Brumley | 380/54 |
| 3,178,993 | 4/1965 | Ferris et al. | 380/54 |
| 3,238,837 | 3/1966 | Woodcock | 380/54 |
| 3,361,511 | 1/1968 | Siegmund | 380/54 |
| 3,621,589 | 11/1971 | Jones et al. | 380/54 |
| 3,778,128 | 12/1973 | Hannan | 380/54 |
| 3,814,904 | 6/1974 | Russell et al. | 380/54 |
| 3,969,830 | 7/1976 | Grasham | 380/54 |
| 4,184,700 | 1/1980 | Greenaway | 380/54 |
| 4,498,736 | 2/1985 | Griffen | 380/54 |
| 4,586,711 | 5/1986 | Winters et al. | 380/54 |
| 5,428,479 | 6/1995 | Lee | 359/567 |

OTHER PUBLICATIONS

IBM Technical Disclosure Bulletin, "Personal Optical Encryption Decryption Device," vol. 28, No. 7, Dec. '85, pp. 3070–3071.

*Primary Examiner*—Gilberto Barrón, Jr.
*Attorney, Agent, or Firm*—Deveau, Colton & Marquis

[57] ABSTRACT

A method of encrypting and decrypting images comprising the steps of creation of an encrypted image by alteration of the original image and decrypting the image by means of a decrypting optic.

26 Claims, 22 Drawing Sheets

| NUMBER OF ENCRYPTION ZONES | EXAMPLE ENCRYPTED IMAGE | OVERLAP ZONE OF DECRYPTED IMAGE |
|---|---|---|
| 2 | <br>FIG. 3A | <br>FIG. 3B |
| 3 | 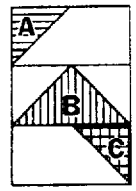<br>FIG. 3C | <br>FIG. 3D |
| 4 | 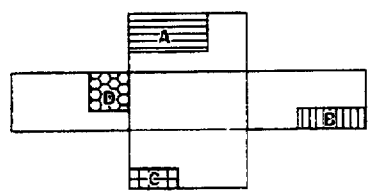<br>FIG. 3E | <br>FIG. 3F |

| NUMBER OF ENCRYPTION ZONES | EXAMPLE ENCRYPTED IMAGE | OVERLAP ZONE OF DECRYPTED IMAGE |
|---|---|---|
| 5 | 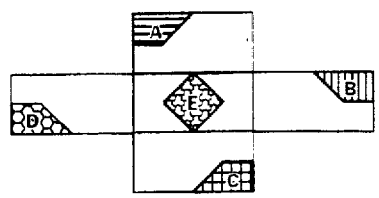 FIG. 3G |  FIG. 3H |
| 6 | 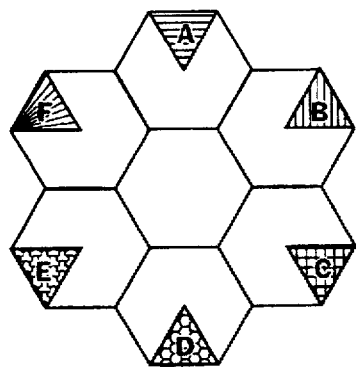 FIG. 3J |  FIG. 3K |

DECRYPTED
IMAGE

\ ı ı v ˙.ր \⁼ ˒

Λ˙ı    ıl˒  - ˒ŋ     Win with APR

/·⌐  v⁻ ı / I ⌐

*HEIROGLYPH*  
*ENCRYPTED IMAGE*

*HEIROGLYPH*  
*DECRYPTED IMAGE*

ENCRYPTED
PIXEL BOXES
IMAGE

DECRYPTED
PIXEL BOXES
IMAGE

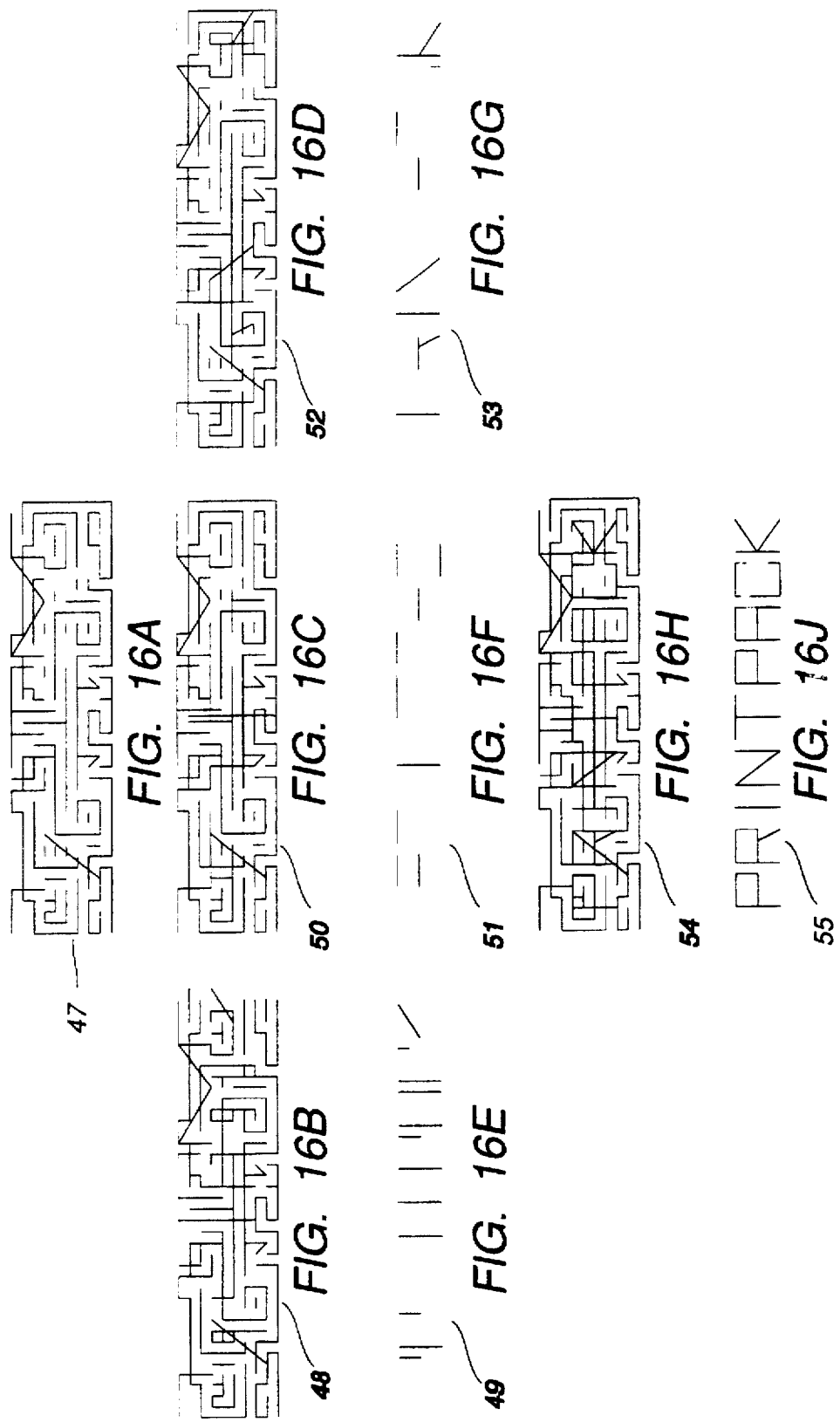

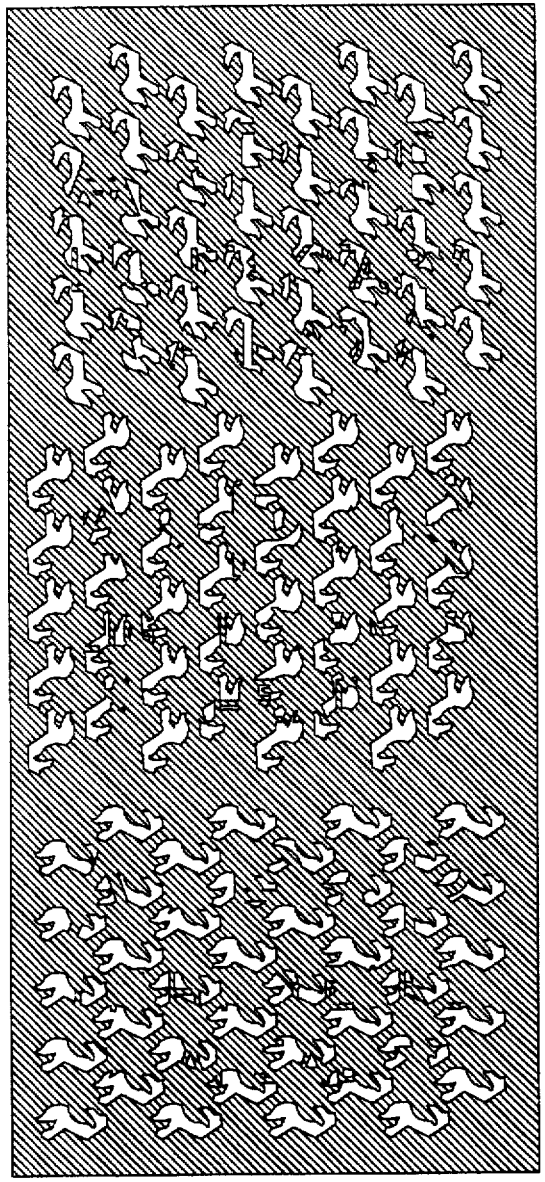
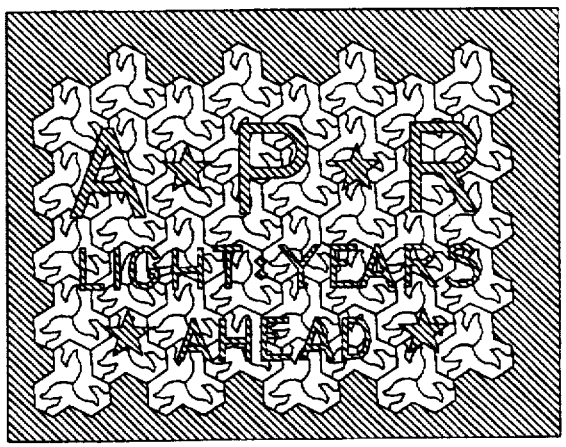
ORIGINAL TESSELATED
ESCHERGRAM IMAGE
FIG. 17B
ENCRYPTED ESCHERGRAM IMAGE
FIG. 17A

DECRYPTED SELF-KEYED IMAGE

SELF-KEYED ENCRYPTED IMAGE

OPTICAL IMAGE ENCRYPTION AND DECRYPTION PROCESSES

This is a continuation of application Ser. No. 07/788,226 filed on Nov. 5, 1991 Abnd.

BACKGROUND

1. Field of the Invention

This invention relates to the encryption and decryption of visual images, and more particularly to processes for disguising the information content of images and subsequent recovery of that information content by optical means. This invention also relates to promotional gaming technology and to document security and document verification. This invention also relates to the surface embossment of plastic film.

2. Description of the Prior Art

A number of disparate fields utilize various methods for hiding, disguising, or encrypting text or image information. In each of these fields it is usually the object to prevent the comprehension of the information content of the encrypted image until a particular time, then the image is decrypted and rendered comprehensible. In particular, this object is central to most promotional game devices and to document security and verification methods.

Businesses utilize promotional games and attach promotional gaming pieces to their products or product packages to draw attention to their products and thereby increase sales over their competition. Two factors of great importance are the attractiveness of the promotion and its perceived fairness. To be perceived as fair, a promotion must utilize promotional gaming methods which present an equal probability of winning to each customer. The attractiveness of a promotion is a complex function of a host of factors, among the strongest of which are its visual appeal and the ability of the consumer to quickly determine if he or she has won. The desire to provide immediate confirmation of a win or loss imposes a difficult condition on promotion game designers: the information communicating the win or loss must be present in the game piece, but to preserve fairness this information must be hidden in an effective manner to prevent individuals from sifting through the products on a store shelf to find winning gamepieces before purchasing the product. In many cases the gamepiece is separate from the product package, and must be attached to or contained within the package, thereby increasing the cost of the package and complicating distribution.

An exhaustive listing of all image encryption and promotional gaming technology prior art would be impractical, so this description will be limited to methods which are either in common use or which are particularly novel.

One of the most commonly employed promotional gaming methods is to print the win/loss information on the liner of a bottle cap. This technique is relatively secure when used with metal bottle cap on a glass beverage bottles containing an opaque product, but relatively insecure when used with plastic bottle caps on clear plastic beverage bottles. The security of the metal cap and glass bottle derives from the opacity of the metal and the large optical distortion which results from viewing through the thick and usually irregular glass surface. Plastic bottle caps are not usually as opaque as metal caps, and the high optical quality of plastic bottle sidewalls frequently enable a revealing view of the underside of the bottle cap to be obtained in the air space over the product, even if the product is opaque. The visual appeal of this promotional method is low. Its attractiveness derives primarily from its perceived fairness. This method has the advantage that the gamepiece is incorporated into the normal package.

Another commonly employed promotional gaming method is to print the win/loss information on a cardboard ticket and to overprint the win/loss information with a rubbery opaque ink. The consumer discovers if the card is a winner by scratching off the opaque ink layer to reveal the win/loss information printed beneath. This method has excellent security if properly executed, but the game piece is generally separate from the package, and requires additional expense to attach it to the product.

Color has been employed to disguise images by printing an image in one color, then overprinting it with another image or pattern in a different color having approximately the same apparent brightness. Adjacent zones of equibrightness appear to visually blend, even though they are of different color, thereby confounding the perception of the original image. The encrypted image can be decrypted by viewing it through a color filter which blocks the image color and passes the confounding color. This method provides only limited image security, since careful inspection of the encrypted image without the color filter can usually reveal the 'hidden' message.

Outside of the field of promotional packaging, methods for hiding, or encrypting, the contents of an image have been employed since the time of Leonardo DaVinci, who kept his notes in mirror writing. In the nineteenth century, visually distorted images were created for amusement. These anamorphic drawings and paintings were designed to be viewed by looking at their reflected image in the surface of cylindrical or conical mirrors. To create an anamorphic image an artist placed a cylindrical or conical mirror on his drawing surface and drew or painted a picture while looking at its image in the reflector. The resulting image appeared grossly distorted to the naked eye, but regained its intended form when viewed by means of the reflecting optic. The reflected image is much smaller than the distorted image. These images were created for their novelty and entertainment value—boxed sets of anamorphic drawings were created for the amusement of children—but not for any serious attempt to disguise the contents of the images.

Another common method for encrypting text images is to stretch the letters in one direction to the extent that they are no longer recognizable. The original text can be viewed by sighting almost parallel to the print surface to provide a geometrical compression effect. This method is of limited value for information encryption, since the decryption method rapidly becomes obvious even to novice observers.

An image encryption method which has been recently developed utilizes Moire patterns to encrypt and decrypt images. An image to be encrypted is decomposed into sets of parallel lines of varying thickness and shape. These sets of lines are provided on separate transparent sheets. Decryption of the image is accomplished by superposition of the line patterns and viewing the overlap, or Moire, pattern. One proposed application of this method is for encoding pictures for security badges. For this application one of the line patterns is incorporated into an identification card, while the other is part of a verification station. Based on published photographs, the decrypted images appear only marginally recognizable, possibly because the encrypted line patterns must not individually contain sufficient image information to be recognizable, yet the sum of the patterns must pass over the information threshold to a recognizable image.

A related image encryption method was recently described by Matsuura. This method is suited for application to images which are represented by an array of binary state pixels, each pixel being either on or off, or black and white.

respectively. A decryption key is first created which contains a random pattern of black and white pixels. The image which is to be encrypted is then superimposed on and XORed with the pattern, so that every black image pixel which lies over a white key pixel remains black, and every black image pixel lying over a black key pixel is reversed to white. White image pixels are reversed to black only if they lie over black key pixels. If the pixel size is small relative to the features of the image, the resulting encrypted image appears to be merely a random pattern of pixels, like the decryption key. Decryption of the image is accomplished by placing a transparent film bearing an image of the key over the encrypted image and aligning the pixel positions. The decrypted image then appears, with areas which were white in the original image displaying a fifty percent black random dot pattern, and areas which were black displaying solid black. Misalignment of the images by a single pixel in any direction will substantially destroy the reconstructed image. More than one image may be combined into a single encrypted image, but separate key patterns are required to reconstruct each one. Because the 'white' regions of the image are decrypted to create a pattern of visual noise, the pixel pattern must be substantially smaller than any distinguishable feature of the desired image. Features which are too small will literally get lost in the visual noise. The background visual noise also reduces the available contrast in the image.

Yet another present method of image encryption and document validation is by embossing a holographic image pattern into the surface of a metallized plastic film. The holographic image does not exist as a pattern of print, but rather as a diffraction pattern which reconstructs an image when illuminated in a particular manner. Conventional embossed holograms are almost always intended to be viewed by reflected light directed at the hologram from above.

Three methods are currently in use for embossing holograms: hard embossing, soft embossing, and extrusion embossing. Each method utilizes an embossing shim which contains a holographic surface relief pattern. In the method of hard embossing, this shim is pressed under great pressure into the surface of a plastic film which has been softened by heat. The softened plastic conforms to the holographic pattern of the shim, cools and hardens, retaining a surface relief pattern which is the negative of the embossing shim. In the method of soft embossing, a plastic carrier sheet is coated with a radiation catalyzable polymeric fluid. The coated surface is brought into contact with the embossing shim and radiation cured in place against it, then peeled from it. The surface of the radiation cured layer then bears a negative impression of the shim holographic pattern. In the method of extrusion embossing a molten plastic is extruded onto a plastic carrier sheet and is brought into contact with the embossing shim under pressure. The molten plastic hardens and cools, retaining a negative impression of the holographic relief pattern of the shim.

Holographic images provide a high degree of security for document validation because they are extremely difficult to duplicate. They are also extremely expensive and difficult to originate. Each new image requires the creation of a new hologram.

It is accordingly an object of the invention to provide an improved set of methods for encrypting and decrypting images and other visual information. A related object is to provide an improved set of methods for ensuring the security of promotional gaming pieces.

It is a further object of this invention to provide novel methods for combining two or more images into an encrypted image in such a manner that each one can be separately optically decrypted and reconstructed.

Another object of this invention is to provide a set of image fragmentation encryption methods for image decryption by multiplexing optics.

It is yet another object of this invention to provide a method for incorporating encrypted images and multiplexing decrypting optics into a plastic bottle label as a promotional gaming piece.

It is another object of this invention to provide methods for combining holographic image components with non-holographic images.

A further object of this invention is to provide methods for the creation of new colors, or the modification of existing colors, in an image by additive color processing by means of multiplexing optics. A related object of this invention is to provide methods for the modification of image colors thorough controlled spectral dispersion.

It is a final object of this invention to provide a set of methods for encrypting visual information and for decrypting that information by means of an embossed diffractive multiplexing optic.

SUMMARY OF THE INVENTION

In accomplishing the foregoing and related objects the invention provides a variety of methods for designing refractive or diffractive multiplexing optics, and a corresponding set of methods for dividing images into two or more sets of unrecognizable fragments in a specific manner such that the resulting image fragments can be visually reconstructed into the original image when viewed by means of the designed multiplexing optic. In the preferred embodiment the image is divided into three sets of image fragments. Two of the three sets of image fragments is linearly displaced an equal distance to either side of the third set of image fragments. The image sets may be in contact with each other, or there may be a gap between them. This image represents the encrypted image. If the image encryption is performed by one skilled in the art, the information content of the original image is not apparent from inspection of the encrypted image. The fragmentation of the original image may be performed by hand by an artist, by optical and photographic means, or preferably, with the aid of a computer graphics system.

High efficiency diffraction multiplexing optics generally consist of a regular pattern of parallel ridges and valleys formed into the surface of a transparent or reflective substrate material. The spacing of the grooves determines the angle between diffractive orders in accordance with the well known grating equation (for a transmission grating): $\sin a = (m) \text{lambda}/d$, where a is the diffraction angle, m is the diffraction order, lambda is the wavelength of the light, and d is the peak-to-peak spacing of the grating. For a particular wavelength, the value of d determines the 'spread' of the diffracted orders. The amount of light which is diffracted into a particular order is determined by three factors: the refractive index of the substrate; the groove shape, and the groove depth. The relationship between these factors is complex. Given a fixed groove shape and substrate refractive index, the proportion of light which is directed into a particular order is determined by the groove depth.

In one embodiment of this invention which has been reduced to practice, the depth of a beam splitting diffraction grating was designed to direct approximately 30% of incident red light (@633 nm) into each of the +1, 0, and −1 diffraction orders. The remaining 10% of light is scattered into various higher orders. This balance of brightness between orders allows the multiplexing of three images without visual 'seams' created by significant brightness differences between images. The grating spacing d was chosen to produce a first order diffraction angle of 10°. Other grating spacings could be chosen to achieve different diffractive angles, and different groove depths could be employed to provide a larger number of brightness balanced diffractive orders.

The number of diffractive orders sets an upper bound on the number of images that can be optically interleaved. Any of the images may be left out, if desired. For example, a three image multiplexer, as described above, may be used to multiplex two images instead of three, the position of the third image remaining blank.

In this invention, multiplexing optics operate on image fragments located in various locations and converge them to form a new image. This effect of placing image fragments into their appropriate location in the final image has been called 'optical collation'. It can be thought of as the optical assembly of a jigsaw puzzle pattern. The multiplexing optic can be discrete or continuous. A discrete multiplexing optic exhibits two or more zones of different optical activity, such as different diffraction angles, grating orientation, or diffractive order efficiencies. A continuous multiplexer does not have separately distinguishable zones of different optical activity, although the optical activity may vary from location to location on the multiplexer. More commonly, the optical activity of a continuous multiplexer will remain substantially constant from point to point. The primary optical activity of a multiplexer is to geometrically translate image fragments into new visual positions without substantial alteration of their geometrical form.

In the preferred embodiment the encrypted image is in the form of a printed image on a plastic or paper substrate.

In one preferred embodiment, the encrypted image is decrypted by optically superimposing the encrypted image onto itself such that two of the optical copies are linearly displaced the same distance to either side of the third copy as the two sets of image fragments were displaced. This creates an overlap zone to which each of the encrypted images contributes one set of image fragments. The overlap zone then contains all of the image fragments in their original positions, resulting in the visual reconstruction of the original image.

An alternate method of decrypting the image is to produce three negative copies of the image on a transparent substrate and to superimpose them to create an overlap zone for reconstruction. Because the image reconstruction is an additive process, rather than a subtractive process, transparent positive copies of the encrypted image will not generally reconstruct the original image. Creating negatives of the images enables their subtractive reconstruction.

Any optical device capable of image multiplexing may be used as a decrypting optic, providing the multiplexing angles and the number of multiplexed images of the optic correspond to the criteria employed in the fragmentation of the original image. For example, a plate of birefringent material, such as Iceland Spar, may be used as a two image multiplexer. Refractive, diffractive, or combined refractive and diffractive optics are more commonly employed to achieve an unlimited range of multiplexing functions.

A refractive multiplexing optic can be created by interleaving small linear prisms having opposite apex orientations. Each set of prisms having a common orientation will accept light from one direction, say ten degrees to the left, and pass it out normal to the planar surface of the optic, while the other set of prisms will accept light from a different angle, say ten degrees to the right. Such an optic will multiplex two images. Adding a plano zone between each of the prisms will convert this into a three image multiplexer, since the plano zones will pass, undeviated, light impinging normal to its surface. Adding more prism sets of different angle will allow more images to be multiplexed, but at the cost of a reduction in image brightness.

The preferred embodiment of the multiplexing optic is a diffractive multiplexer embossed onto a plastic film. This is a diffraction grating which has been specifically designed to enhance selected diffractive orders and suppress others by control of the shape, depth, and spacing of the diffractive grooves according to methods commonly employed by diffractive optic designers. Diffractive multiplexers can be created having two, three, four, or more diffractive orders of approximately equal intensity. As with refractive multiplexers, the brightness of any single image decreases as the number of multiplexed images increases. Three image multiplexing achieves a good balance between the need to divide an image into many widely separated parts to disguise its information content and the need to retain overall image brightness. It is desirable, in general, to equalize the brightness of each order so each optical copy of the encrypted image is of equal brightness. This enhances the visual blending of the separated image fragments in the reconstruction of the original image by the decryption process.

Diffractive optics are inherently chromatically dispersive. The effect of chromatic dispersion is to create color fringing at the edges of the image fragments. In order to keep this effect from creating objectionable visual smearing of the reconstructed image, encrypted images are usually printed with red or orange ink on a black background. Red and orange pigments tend to be spectrally pure, reflecting a narrow range of colors, thereby limiting the effect of chromatic dispersion.

Achromatic multiplexing optics can be created by cancelling refractive chromatic dispersion with diffractive chromatic dispersion of the opposite sense. This method has been employed to produce achromatic interocular lenses by adding a so-called binary optic diffraction pattern to the surface of a chromatically dispersive lens. This method can be applied to create achromatic refractive prisms for a combined refractive-diffractive multiplexer. It is also possible to create a self-achromatizing refractive prism multiplexer by judicious selection of the prism dimensions such that the prism spacing creates a diffraction chromatic dispersion which cancels the refractively produced chromatic dispersion. Since the chromatic dispersion of an achromatic multiplexer is very small, colors other than red and orange can be used in the encrypted image.

In some cases chromatic dispersion produces a desirable effect in the reconstructed image. Through artful creation of the encrypted image, white image regions against black or a colored background can be chromatically dispersed to produce brilliant 'electric' colors by controlled overlapping of color fringing from different image fragments. Thus is it possible to create colors in the reconstructed image from a black and white encrypted image.

Through the use of multiplexing optics having little or no chromatic dispersion it is also possible to create new colors in the reconstructed image by means of the additive color effect. Regions of different colors, such as red and green, in the encrypted image can be selectively overlapped in the reconstructed image to create the perception of new colors, such as yellow. Thus it is possible to produce reconstructed images which have radically different coloration than the encrypted images from which they derived.

If a chromatically dispersive multiplexing optic is placed in close proximity to an image, the effect of the chromatic dispersion is minimized. The size of the image overlap zone decreases as the multplexer is moved closer to the image. To create encrypted images which reconstruct to an image size larger than the overlap zone it is necessary to divide the original image into encryption zones which are the size of the overlap zone. Decryption of this image is accomplished by creating two or more visual copies of the encrypted image and displacing them from each other by a distance equal to the width of the overlap zone. This method of image encryption makes the encrypted image its own key. It is most easily performed with a two image multiplexer, since a larger number of images greatly complicate the creation of the encrypted image.

Other multiplexing optic geometries can be employed with this method. Two designs of particular interest are radially symmetric designs and discrete zone multiplexers. Radially symmetric multiplexers can be discrete or continuous. In general, a radially symmetric multiplexer combines images from radially or circumferentially disposed zones. Discrete zone multiplexers possess two or more regions of different multiplexing action. Each multiplexing zone may have a different optical 'footprint', the zone from which images are drawn, of different shape, size, or orientation.

DESCRIPTION OF THE DRAWINGS

FIG. 3 depicts various representative multiplexing patterns for two to six images;

FIG. 11 depicts an image encrypted by the Heiroglyph method and the reconstructed multiplexed image it produces;

FIG. 16 schematically depicts the Disappearing Mazes encryption method;

FIG. 17 depicts an image encrypted by the Eschergram method and the reconstructed image it produces;

DETAILED DESCRIPTION

Figure 1A:
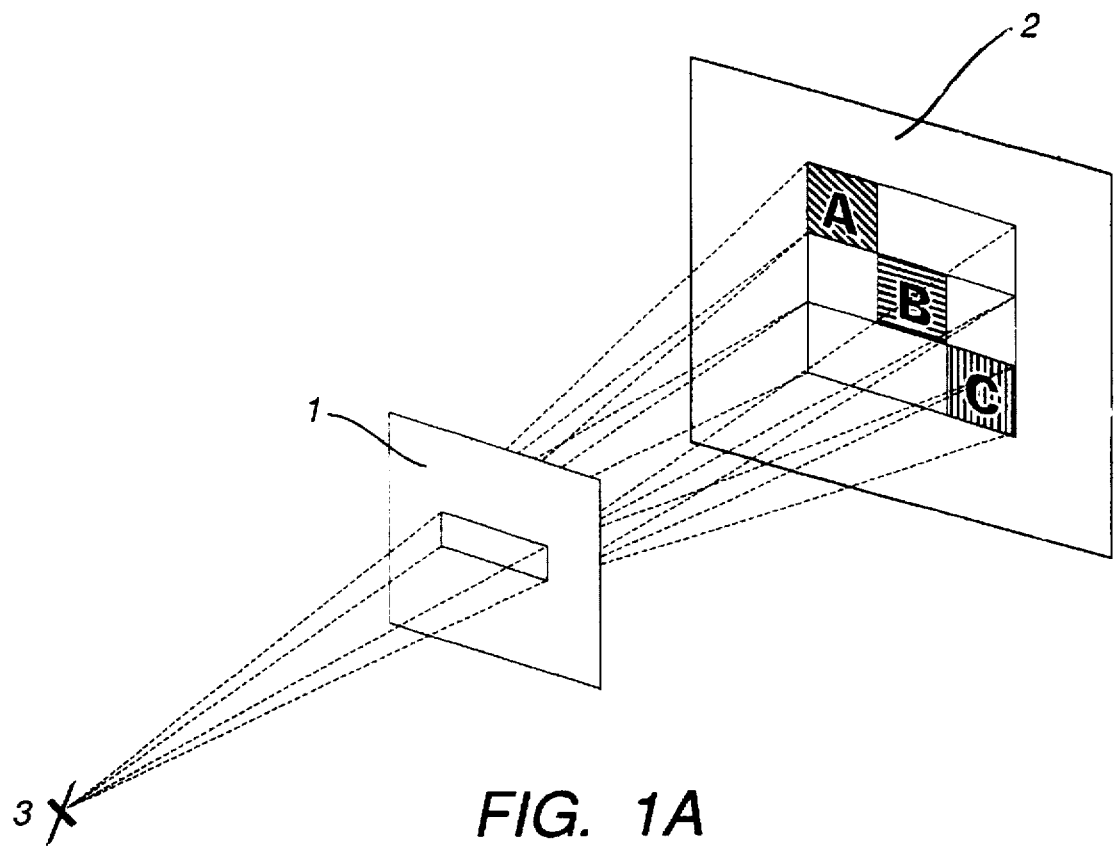
FIG. 1 is a schematic perspective illustration which depicts a three image linear multiplex decoding arrangement.
Figure 1B:
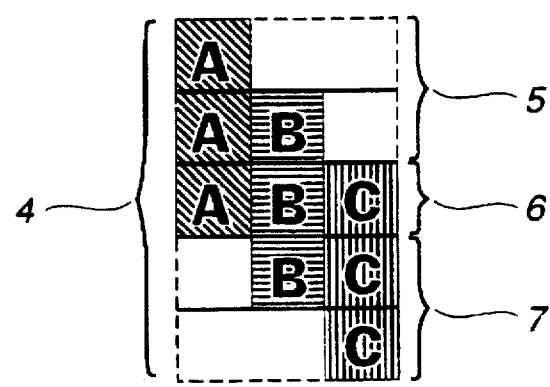

FIG. 1 is a perspective schematic of an example three image multiplexing system, comprising a three-way multiplexing optic 1, an encrypted image 2, a viewing eye point 3, and a decrypted image 4. The decrypted image 4 consists of three zones, the upper partial overlap zone 5, a central overlap zone 6, and a lower partial overlap zone 7. Encrypted image 2 is divided into three zones, lettered A, B, and C, which are vertically displaced from one another. The amount of displacement between the zones depends on the diffraction angle of the multiplexing optic 1 and the distance between the multiplexing optic 1 and the encrypted image 2. When an observer views the encrypted image 2 through the multiplexing optic 1 from an eye point 3, he sees the decrypted image 4. The multiplexing optic 1 creates three visual copies of the encrypted image 2 which overlap to create the decrypted image 4. The upper overlap zone 5 and the lower overlap zone 7 do not contain all of the image zones, and do not reconstruct the complete image. The central overlap zone 5 contains all of the image zones, reconstructing the complete image, including zones A, B, and C.

In a preferred embodiment the multiplexing optic 1 is a diffractive multiplexer, creating the three images by controlled distribution of image light into the +1, 0, and −1 diffractive orders. The intensity of the light directed into each of the orders is usually chosen to be approximately equal so that the resulting three images will be of substantially equal brightness. Although this figure illustrates the use of a three-way multiplexer, it should be understood that this invention is not limited to three image multiplexing, but may be implemented with optics having any desired number of multiplexed images.

The incompletely reconstructed images seen in the upper partial overlap zone 5 and the lower partial overlap zone 7 may be altered or eliminated by including additional image zones above zone A and below zone B in the encrypted image. (For example: Placing a vertically displaced copy of zone C above zone A and a vertically displaced copy of zone A below zone C will result in the reconstruction of three centrally positioned complete images, vertically displaced, with incompletely reconstructed images above and below them.)

The eye point 3 is not actually a specific point in space, but is meant to represent a viewing point from which the observer can see the decrypted image 4 by means of the multiplexing optic 1.

It should be understood that the simple design of the encrypted image 2 as depicted in this figure is for the purpose of clarity. The division of the image into zones is usually accomplished according to any of a variety of image encryption design methods, some of which are described in detail in later figures.

The multiplexing optic may be of any type; birefringent, refractive, diffractive, or any combination of these. Because of mass production considerations, an embossed diffractive multiplexer is preferred. In accordance with principles known to those versed in the art of diffractive optics, the groove shape of the diffractive multiplexer can be chosen to produce any number of brightness balanced diffractive orders, with the associated substantial suppression of undesired orders.

Figure 2:
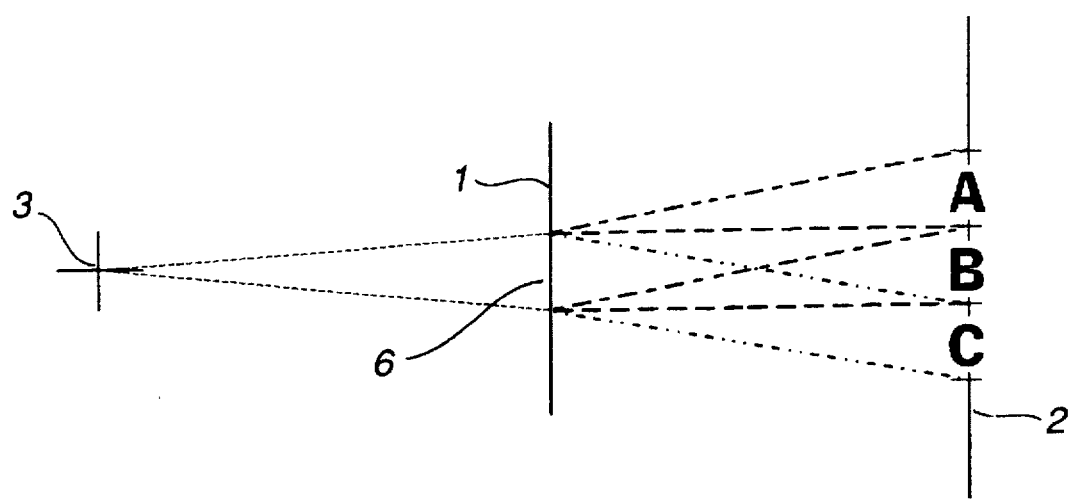
FIG. 2 is a schematic illustration which shows a side view of the arrangement of FIG. 1.

FIG. 2 is a schematic side view of the arrangement of FIG. 1, clarifying how the three image zones are combined by the multiplexer in the central overlap zone 6 of the decrypted image 4. Encrypted image zone A is diffracted into the central overlap zone 6 along the plus-one diffractive order angle, zone B is passed through without diffraction along the zeroth order of the multiplexing optic 1, and zone C is diffracted into the central overlap zone 6 along minus-one diffractive order angle.

Although the preferred embodiment of this invention incorporates a three-way linearly multiplexing optic, optics which multiplex other numbers of images from various directions can be used. There are an unlimited number of ways in which the images can be arranged. FIG. 3 is a chart depicting example encrypted image 8 arrangements for multiplexing arrangements from two through six encrypted image zones and the central overlap zone of their associated decrypted images 9. Since the purpose of image encryption is to disguise the content of the image, the division of the encrypted images into zones is normally performed in a more complex manner than depicted in FIG. 3. Each of the encrypted image zones may overlap any or all of the other image zones in the formation of the decrypted image, and any part of the decrypted image may be dispersed into any of the encrypted image zones, as taught by the illustrations and descriptions of various multiplexed image encryption processes presented in later figures.

Figure 4:
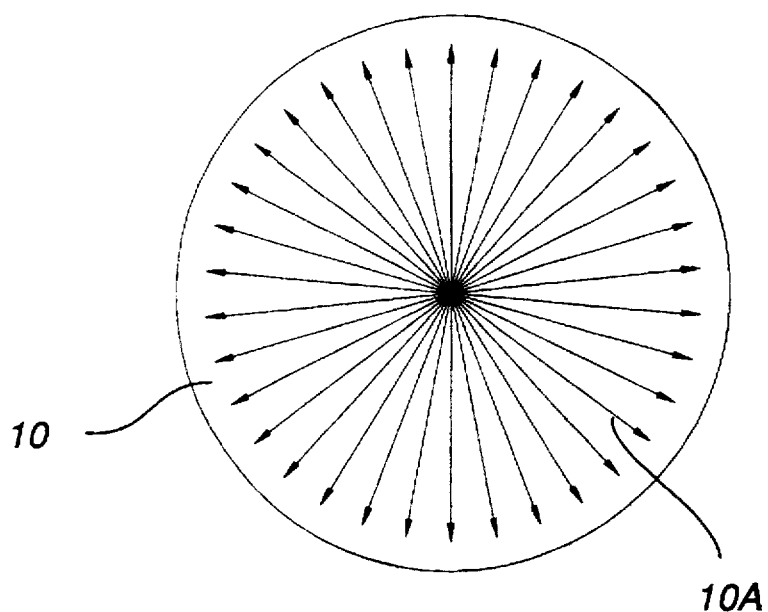
FIG. 4 is a schematic illustration depicting a radial multiplexing optic.
Figure 5A:
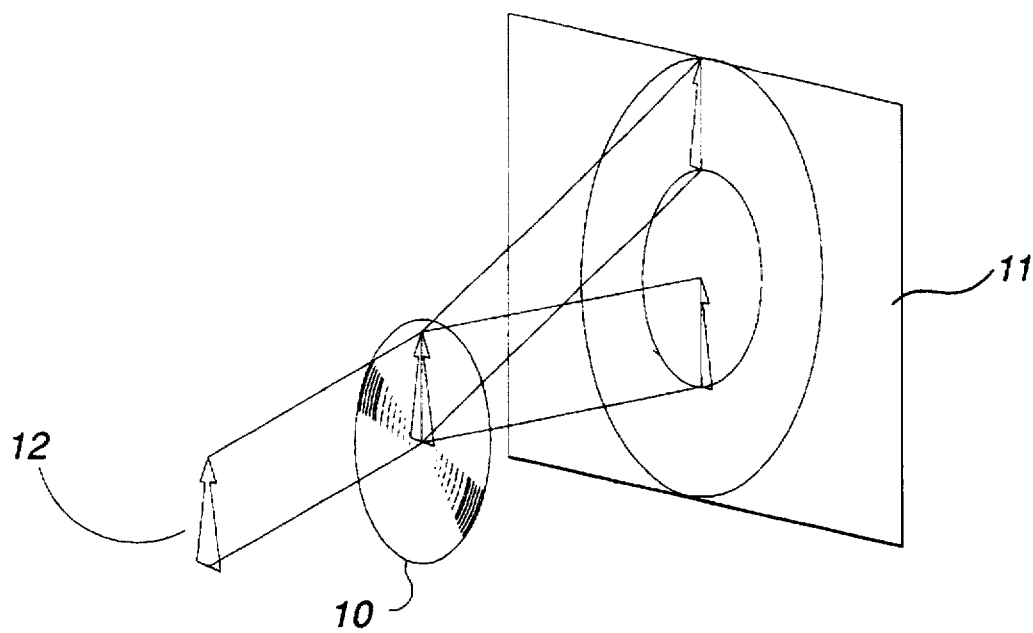
FIGS. 5A and 5B are schematic perspective illustrations which depict a radial multiplexing decrypting arrangement.
Figure 5B:
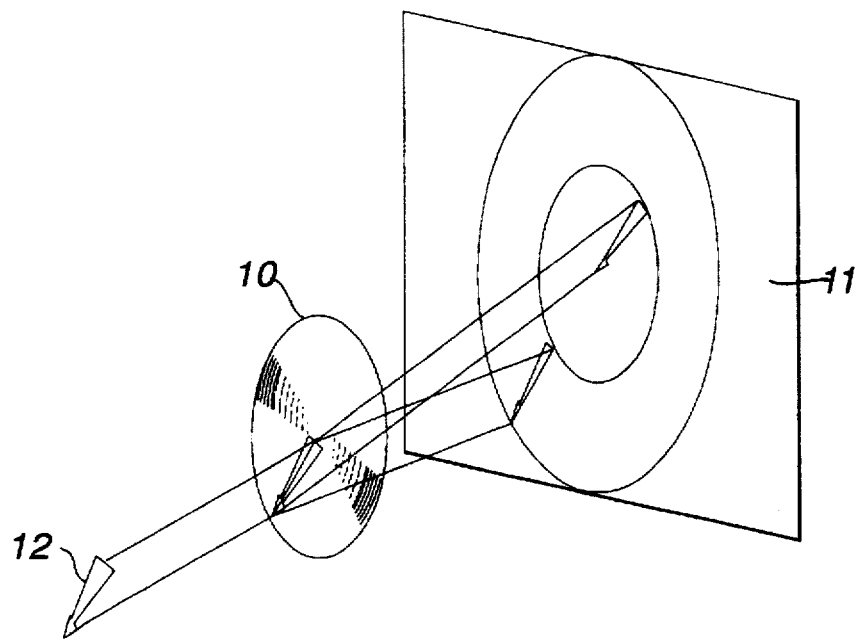
Figure 6A:
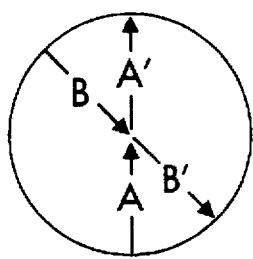
FIG. 6 is a schematic depicting image zone patterns produced by the optic of FIG. 5 at two different image plane distances.
Figure 6B:
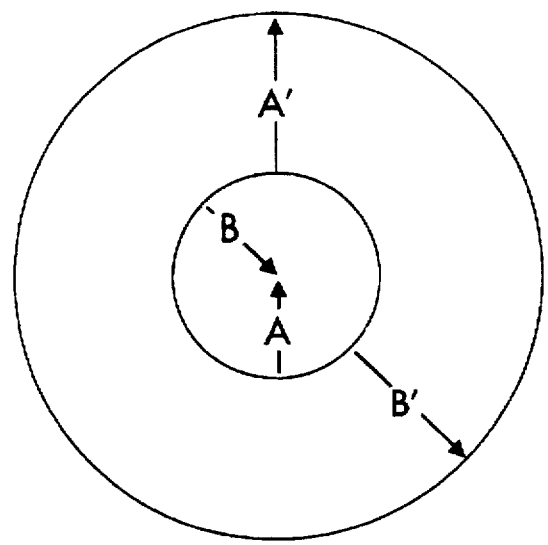

For certain applications it may be desirable to produce a radially symmetric multiplexing optic to desensitize the image decryption from differential rotation between the optic and the encrypted image. FIG. 4 is a schematic of a radial multiplexing optic 10. The multiplexing axes of this optic are directed along radial lines. A radially symmetric optic could also be created having discrete sectors, like pie wedges. FIGS. 5a and 5b are schematic perspective views of a radial multiplexing decrypting arrangement incorporating a radial multiplexing optic 10 and a radial multiplex encrypted image 11. FIG. 5a depicts the selection of radially disposed image zones, represented by half arrows, to form the decrypted image 12, represented by a complete arrow. FIG. 5b illustrates this radial multiplexing effect for another set of radially disposed image zones. The geometry of a radially encrypted image varies according to the distance from the image to the optic, as depicted in FIG. 6. The encrypted near image pattern 13 consists of a circle having image zones placed end to end along a diameter. The encrypted far image pattern 14 consists of two circles having image zones arranged along diameters and separated by a distance. The exact geometry of the encrypted image pattern depends on the distance of the encrypted image from the radial multiplexing optic 10.

Figure 7:
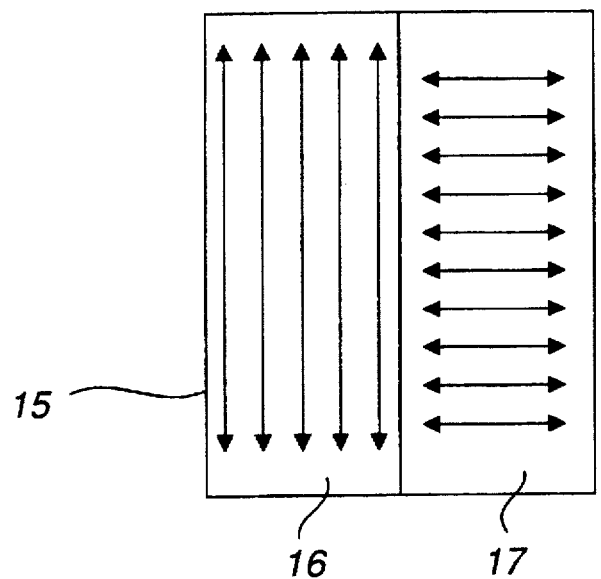
FIG. 7 is a schematic depicting the optical action of an example design for a discrete zone multiplexing optic.
Figures 8A, 8B:
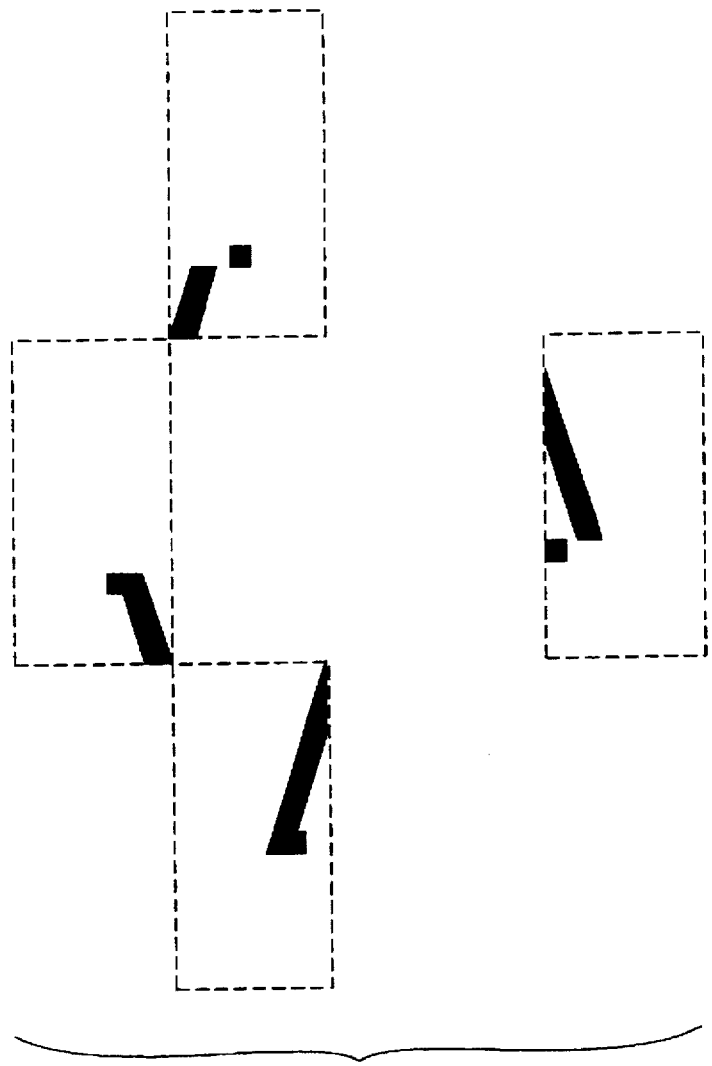
FIG. 8 depicts an image and its encrypted form designed for use with the optic of FIG. 7.

FIG. 7 is a schematic depiction of an example discrete zone multiplexing optic 15 consisting of two multiplexing zones, a vertically oriented multiplexing zone 16 and a horizontally oriented multiplexing zone 17. Discrete zone multiplexing optics allow additional fragmentation of the encrypted image. The variety of possible multiplexing zone geometries is unlimited, and should not be construed to be limited to the simple arrangement depicted in FIG. 7. FIG. 8 depicts a simple discrete zone multiplex encrypted image 18, designed for use with the discrete zone multiplexing optic 15 of FIG. 7. The left and right zones of the encrypted image 18 are merged by the horizontal multiplexing zone 17 of multiplexing optic 15. The upper and lower zones of the encrypted image 18 are merged by the vertical multiplexing zone 16 of multiplexing optic 15. The combined image zones form the decrypted image 19.

Since diffractive multiplexers are generally highly chromatically dispersive, it is desirable to print or otherwise display the encrypted image in a substantially monochromatic manner. As a printed image, the preferred method is to render the background in black or another dark color, and the foreground image in red or orange. Red and orange inks tend to reflect a narrower range of colors than yellow, green, or blue inks. The narrow reflection spectrum of red and orange inks reduces the effect of chromatic dispersion. Other foreground display colors can be used if the chromatic dispersion of the multiplexing optic is limited. This may be accomplished by placing it close to the encrypted image, by limiting its diffraction angle, or by rendering it achromatic. The first two methods can be employed with conventional diffractive multiplexing optics, and are particularly well suited to the Self-Keyed encryption method, explained in FIG. 18.

Figure 9:
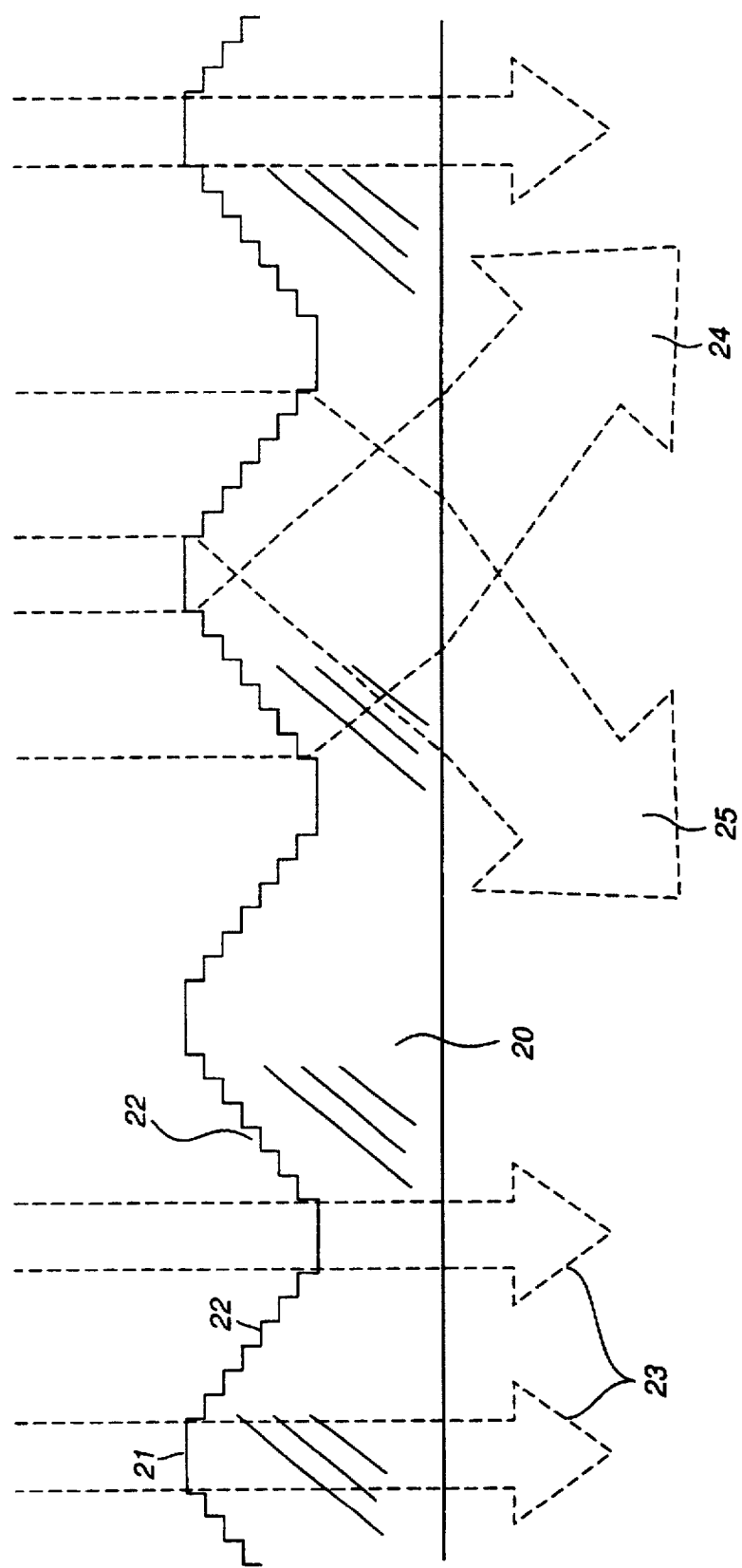
FIG. 9 is a schematic cross section depicting a combined refractive-diffractive achromatic multiplexer.

Multiplexing optics which are strictly diffractive or refractive in nature will exhibit chromatic dispersion. It has been shown by Wilfred Veldkamp, of Lincoln Laboratories, that a diffractive element superimposed on a refractive element can correct for chromatic dispersion. A combination refractive/diffractive achromatic multiplexer design is illustrated in FIG. 9. The surface relief of an optical substrate 20 incorporates plano zones 21 and prismatic zones with binary optic chromatic correction 22. Light which passes through the plano zones 21 is transmitted without deviation 23. Light passing through the binary optic chromatically corrected prismatic zones 22 is deflected to the left 25 or right 24 according to the orientation of the step. The light deflection of the prismatic zones 22 is accomplished by a combination of refraction and diffraction. The overall deflection of the light is a refractive effect, just as with a conventional refractive prism. All optical materials suffer some degree of chromatic dispersion, and the binary optic pattern is designed to produce the same degree of chromatic dispersion of the opposite sense, thereby cancelling the refractive chromatic dispersion. The scale of the surface relief pattern shown in FIG. 9 will depend on a large number of factors, including the nature of the optical substrate 20, the intended viewing distance from the optic, and the size of the encrypted image. Typical dimensions for the width of the prismatic zones 22 and the plano zones 21 would be in the range of 10 to 100 microns. The width of the binary optic steps typically range from one to ten microns, and their step height is usually in the submicron range. The design depicted in FIG. 9 balances the projected areas of the plano zones 21 and the prismatic zones 22 to equalize the transmitted intensities of the three beams. Different area ratios will produce proportionate intensity differences. Additional prismatic zones of other refractive angles can be added to an achromatic multiplexer of this type in order to multiplex more than three images, or zones can be removed to reduce the device to a two image multiplexer.

Figure 10:
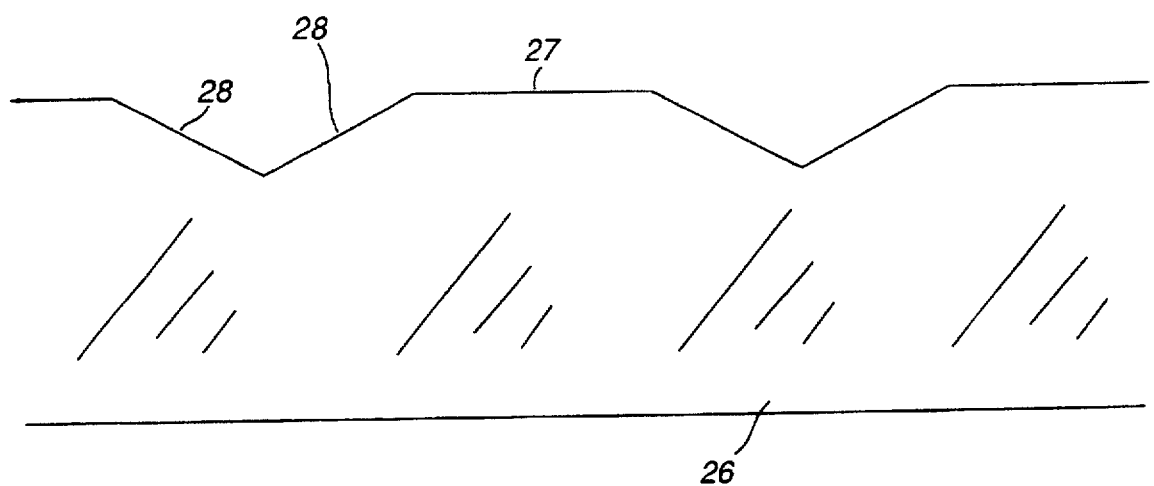
FIG. 10 is a schematic cross section depicting a self achromatizing multiplexer.

An alternative approach, illustrated in FIG. 10, to create an achromatic multiplexer is to dimension it to be self-achromatizing. This design consists of an optical substrate 26 bearing a repeating pattern of plano zones 27 and prismatic zones 28 which are fabricated at a pitch which is chosen in accordance to the desired image deflection angle of the prisms and the chromatic dispersion of the prism material. Specifically, the pitch dimension is chosen to balance the diffractive dispersion of the repeating pattern against the refractive dispersion of the individual prisms.

EXAMPLE

Self-achromatizing Acrylic Three Image Multiplexer

Choosing acrylic as the optical substrate material and a multiplexing angle of 10° for the sodium yellow D-line, the refractive dispersion of the prism is found from the difference in the refraction angles for the c and f lines:

Acrylic $n_d$=1.491 $n_c$=1.4892 $n_f$=1.4978
d-line=0.5896 microns
c-line=0.6563 microns
f-line=0.4861 microns Angle of Prism, Assuming Normal Incidence on One Face $$n_d \sin(a) = \sin(a+10°) \rightarrow a = 18.93°$$

Refraction of the F-line $$n_f \sin(18.93°) = \sin(18.93°+b) \rightarrow b = 10.14456°$$

Refraction of the C-line $$n_c \sin(18.93°) = \sin(18.93°+g) \rightarrow g = 9.96177°$$

Refractive dispersion: b−g=10.14456−9.96177= 0.182787°

Diffractive dispersion: calculation of 'grating period' to balance the refractive dispersion:

$$0.182787° = a \sin(0.6563/s) - a \sin(0.4861/s)$$

s=53.3533 microns
prism height=53.3533 tan (18.93°)=18.3 microns

The sense of the refractive and diffractive dispersions are opposite, so they cancel each other, leaving a substantially achromatic image multiplexer.

A number of different multiplexing optic image encryption methods have been developed which produce significantly different encrypted images, including Hieroglyphics, White Holes, Scattergrams, Pixel Boxes, Eschergrams, and Disappearing Mazes. Some of these methods, notably White Holes, Eschergrams, and Scattergrams, allow for the creation of encrypted images that appear nearly identical, yet decrypt to form entirely different final images.

FIG. 11 illustrates the Hieroglyphics encryption method. In this method, a final text image is fragmented by dividing the constituent letters into geometric elements and separating those elements into two or more zones of the encrypted image. The letter 'T', for example, can be fragmented into a vertical bar and a horizontal bar. The resulting encrypted image bears more of a resemblance to ancient hieroglyphs than to a modern letter. Reconstruction of the 'T' can be performed by optically displacing the two fragments into alignment again with a suitable multiplexing optic. In FIG. 11 the initial 'W' is fragmented into three pieces: the left downstroke is placed in the upper zone of the encrypted image 29; the central inverted 'v' shape is placed in the center zone; and the right side of the 'W' is place in the lower zone of the encrypted image 29. When the three image zones are recombined by means of a three image multiplexer, they form the legible Hieroglyphic decrypted image 30.

Figure 12:
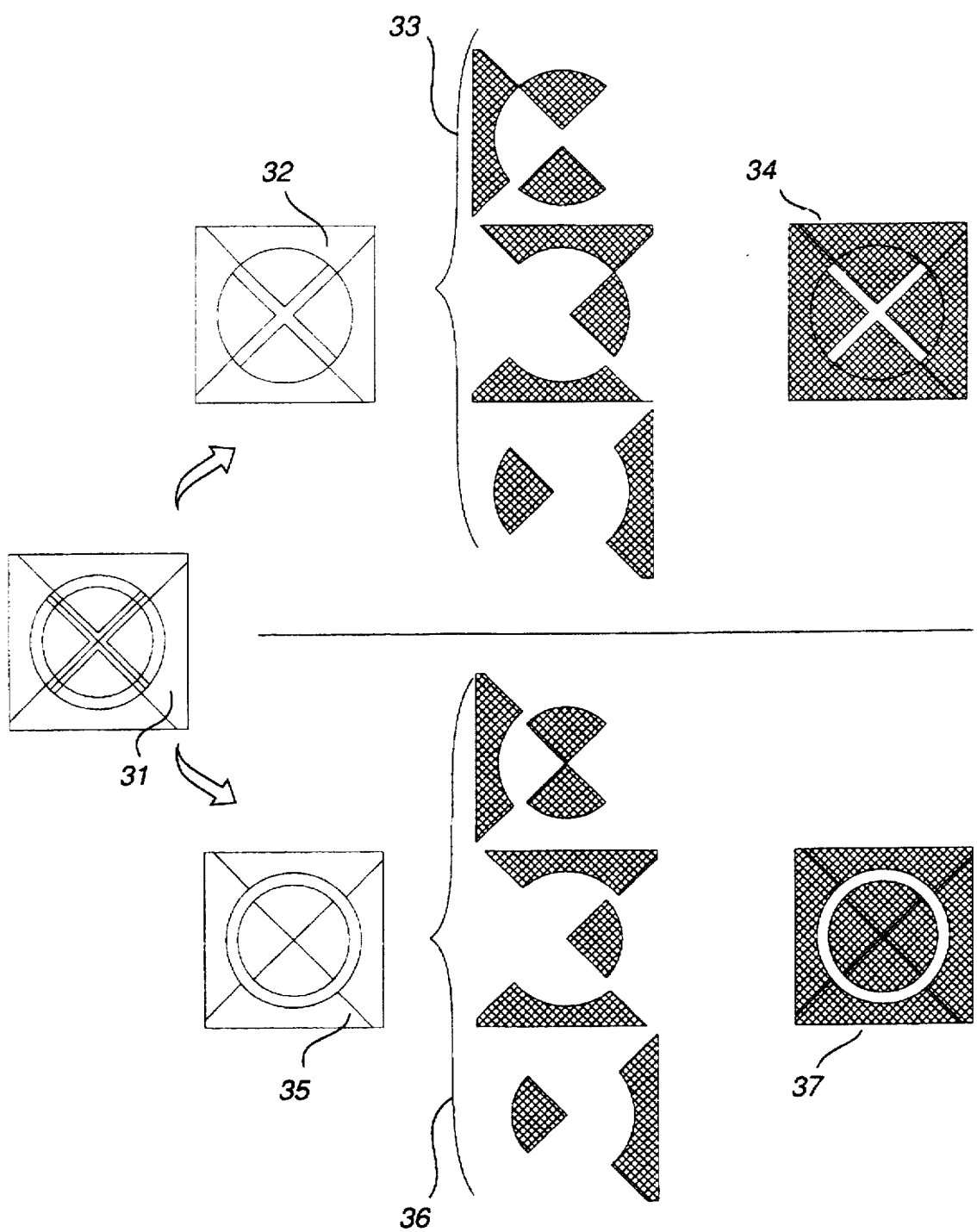
FIG. 12 schematically depicts the White Hole image encryption method as applied to produce either a cross or a circle.

FIG. 12 illustrates the White Holes encryption method. In this method an image is fragmented by dividing the background of the image into pieces and separating these pieces into two or more zones of the encrypted image. This technique is especially useful for creating encrypted images that decrypt to form different images, yet appear very similar in their encrypted form. This may be accomplished by defining the cutting lines by the intersection of the centerlines or boundaries of two or more images, as illustrated in FIG. 12. A base pattern 31 is created which contains both images, a circle and a cross in this case, as well as additional fragmentation lines which serve to enhance the disguising of the information content of the encrypted image. From the base pattern 31 two different encrypted images can be created which will decrypt to form either the cross or the circle. To create an encrypted image for the cross, the circle pattern is collapsed to its outer ring. This circle, along with the outline of the cross and the additional fragmentation lines form the cutting line pattern for the cross 32. The background shapes bounded by the cutting line pattern 32 are then filled and separated into three linearly displaced zones to form the encrypted image of the cross 33. The hatched colored regions of the encrypted image 33 represent the background of the image of the cross. The geometry of the cross itself is hidden in the gaps, or holes, between these pieces. When the encrypted image 33 is decrypted by means of a three image multiplexer, the central overlap zone of the decrypted image 34 reveals the cross. The upper and lower partial overlap zones of the decrypted cross image 34 are omitted from FIG. 12 for clarity.

To create an encrypted image for the circle, the cross pattern of the base pattern 31 is collapsed to its centerlines, yielding the cutting pattern for the circle 35. The background shapes bounded by the cutting line pattern 35 are then filled and separated into three linearly displaced zones to form the encrypted image of the circle 36. The hatched colored regions of the encrypted image 36 represent the background of the image of the circle. As with the encrypted image of the cross, the geometry of the circle itself is hidden in the gaps, or holes, between these pieces. Visual comparison of the two encrypted images, 33 and 36, reveals them to be extremely similar. Close examination reveals subtle differences, and it is these differences which enable the patterns to reconstruct different images. When the encrypted image 36 is decrypted by means of a three image multiplexer, the central overlap zone of the decrypted image 37 reveals the circle. The upper and lower partial overlap zones of the decrypted circle image 37 are omitted from FIG. 12 for clarity.

Additional cutting lines may be added to the White Holes base pattern to further disguise the information content of the encrypted images. Although FIG. 12 illustrates this method as applied to the combination of two patterns in an image and the use of a three image multiplexer for decryption, the White Holes method can be implemented with only one pattern or more than two patterns, and with optics which multiplex any number of images.

Figure 13A:
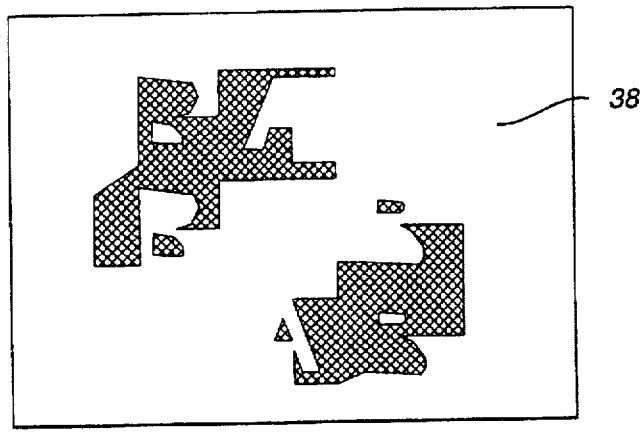
FIG. 13 depicts a two image encrypted White Hole image and the reconstructed images which result from multiplexers oriented along horizontal and vertical axes.
Figure 13C:
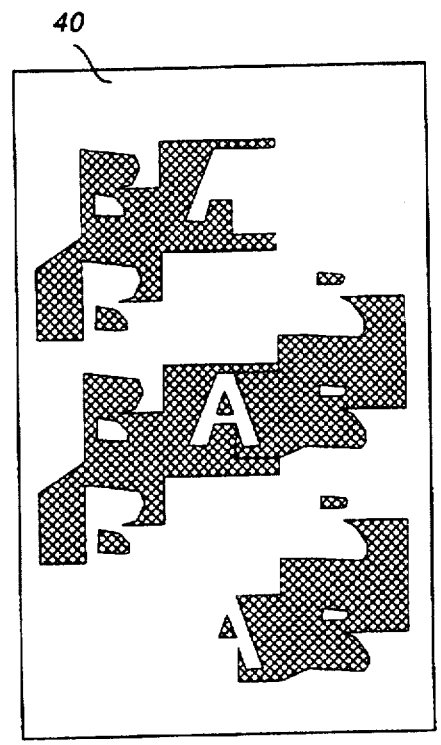
Figure 13B:
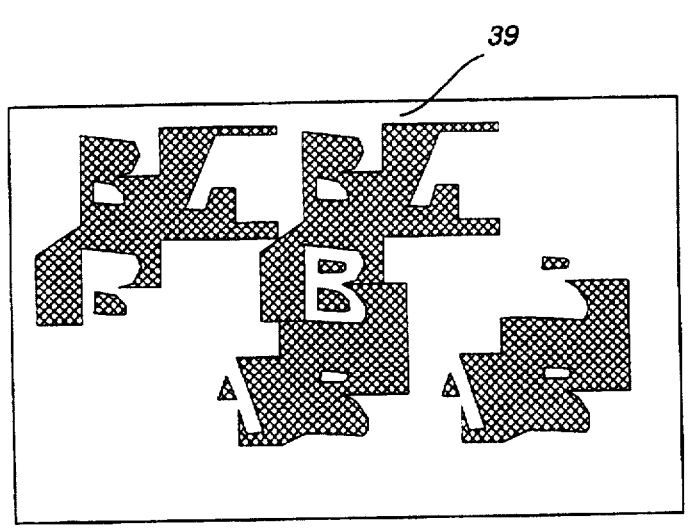
Figure 14A:
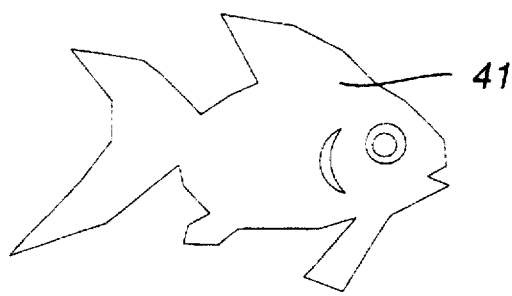
FIG. 14 schematically depicts the Scattergram image encryption method.
Figure 14B:
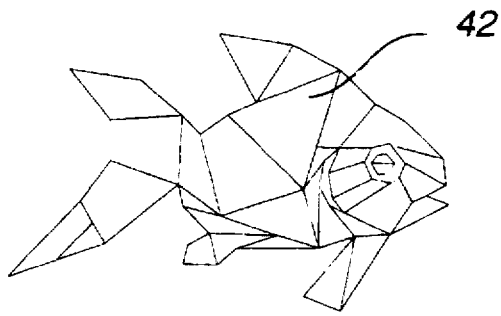
Figure 14C:
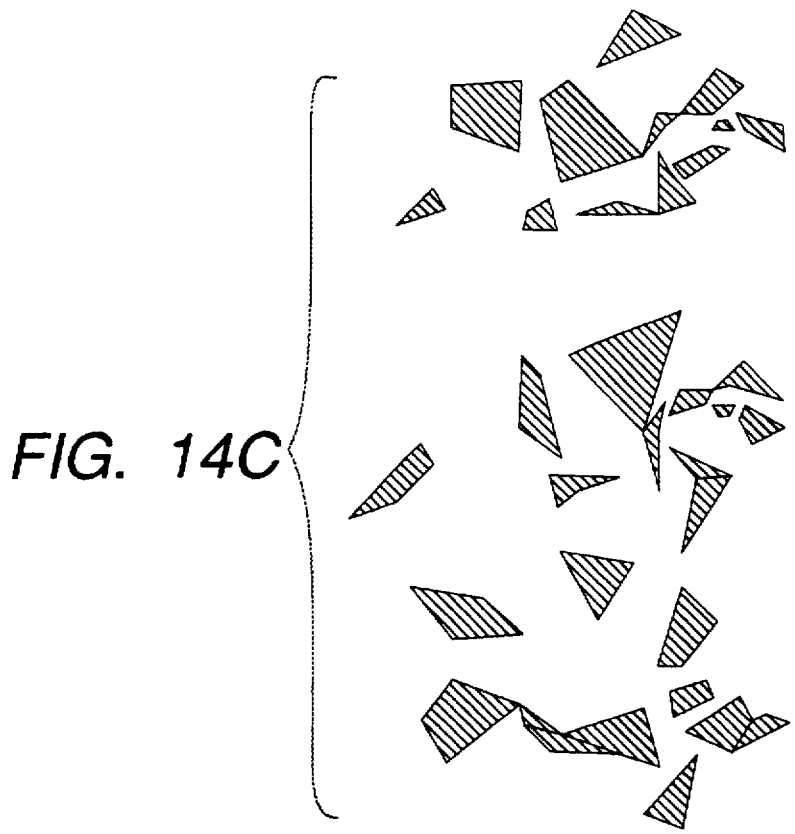
Figure 14D:
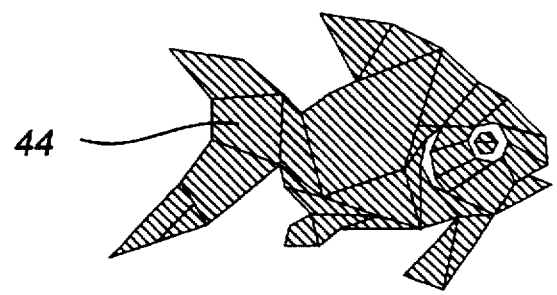

FIG. 13 illustrates the use of the White Hole image encryption method applied to create an encrypted image which can be decrypted two produce either of two images. If the encrypted white hole image 38 is decrypted by means of a multiplexing optic which horizontally displaces the image copies the letter 'B' is produced in the central overlap zone of the decrypted image 39. If the decrypting optic is rotated ninety degrees, so that it produces vertically displaced copies of the encrypted image 38 the vertically decrypted image 40 reveals the letter 'A' in the central overlap zone. This technique may be applied to a larger number of figures which are each decrypted from a suitably created encrypted image by a different orientation of the decrypting optic or by using decrypting optics having different optical action.

FIG. 14 illustrates the Scattergrams image encryption method. In this method the encrypted image 43 is produced by fragmenting the original image 41 by dividing it into pieces having geometries which are similar to that of the original image. The Scattergram cutting lines 42 are designed to break the visual continuity of the encrypted image through the introduction of false lines of continuity. The image fragments generally appear similar to shards of broken glass scattered on a surface, hence the name 'Scattergrams'. As in previous examples, the piece shapes delineated by the cutting lines 42 are distributed into three image zones in the encrypted image 43. Decryption of the encrypted image 43 by means of a three image linear multiplexing optic results in the decrypted Scattergram image 44. Only the central complete overlap zone of the decrypted image is shown in FIG. 14 for clarity.

Figure 15A:
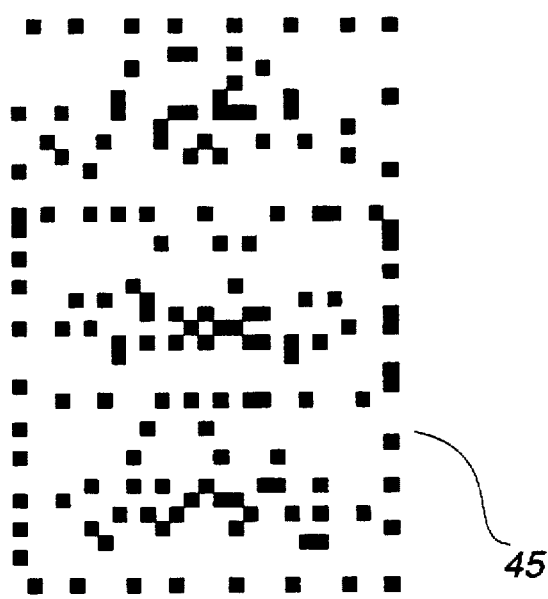
FIG. 15 depicts an encrypted Pixel Boxes image and its reconstruction.
Figure 15B:
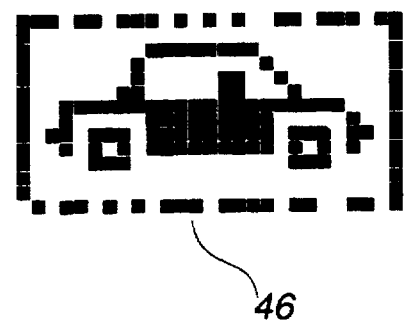

FIG. 15 illustrates the Pixel Boxes image encryption method. In this method an image is created by 'turning on' pixels in a grid in a suitable pattern, as shown in the decrypted Pixel Boxes image 46, then fragmenting this image by selecting different sets of pixels to appear in each of two or more zones of the encrypted image, 'turning off' those pixels in the other zones. The Pixel Boxes encrypted image 45 was so generated. When the encrypted image 45 is viewed by means of an appropriate multiplexing decrypting optic, a three image linear multiplexer in this case, the central overlap zone of the decrypted image 46 will contain the restored original image. The Pixel Box grid may be composed of square, rectangular, triangular, hexagonal, or other shape pixels. The zones of the encrypted image may be abutted to each other, forming a continuous pattern of seemingly random pixels, or the encrypted image zones may be more widely separated.

FIG. 16 illustrates the Disappearing Mazes image encryption method. This method utilizes additive color processing to cause selected parts of an image to disappear, thereby revealing the decrypted information. The example of the Disappearing Mazes method illustrated in FIG. 16 is designed for use with a three image linear multiplexing optic. Because the decrypting optic selected is a three image multiplexer, the encrypted image contains three zones. The first zone contains a maze pattern 48 printed in red ink on a white or neutral grey background. The red maze 48 consists of a base maze 47, pattern plus Heiroglyph-method letter fragments, which constitute the differences in the red maze 48 from the base maze 47. A second encrypted image zone contains a green maze 50 printed on the same color background as the red maze 48. The green maze 50 consists of the base maze 47, combined with other Heiroglyph-method letter fragments, which constitute the differences in the green maze 51 from the base maze 47. The third zone of the encrypted image contains the blue maze 52, consisting of the base maze 47, and the remaining Heiroglyph-method letter fragments, which constitute the differences in the blue maze 53 from the base maze 47. The blue maze 52 is also printed on the same color background as the other two mazes. The blue maze 52, the green maze 50, and the red maze 48 each differ from the base maze 47 and from each other, but the presence of the base maze 47 lines confuses the perception of the Heiroglyph letter fragments in each zone. The colors of the mazes are chosen so that when they are visually overlapped by the decrypting optic the resulting color of the combined mazes 54 is the same as the background color. The common parts of the mazes are thereby visually 'canceled out', leaving only the non-common parts, the differences 49, 51, and 53. The sum of the maze differences 55 is a multicolored decrypted image.

Other numbers of encrypted image zones can be used, and other colors can be used, besides those presented in the example of FIG. 16. For example, one method for employing two mazes is to color the mazes red and green, and to color the background yellow. The additive combination of red and green results in yellow, so the mazes can be caused to cancel each other and to blend into the background, leaving only their differences.

Additive color processing can also be applied to other image encryption methods. By dividing the encrypted image into color regions that can be separated into image zones in conjunction with any image encryption method, including but not limited to those listed above, a decrypted image can be designed to which incorporates overlapping regions of different colors. The perceived color of the overlap zones will depend on the colors which are overlapped according to the principles of additive color creation.

For example, if an image of a red rectangle is caused to partially overlap an image of a green rectangle, the region of overlap may appear yellow. The encrypted image contained only red and green, but the decrypted image would contain red, green, and yellow. By grading the intensity of the colors in a region of overlap it is possible to produce graded tones, such as the grading of red and green regions to produce a succession of red, orange, yellow-orange, yellow, yellow-green, and green in their overlap region. Through the graded addition of three colors, such as red, blue, and green, a range of colors can be obtained that span the spectrum, including white. By this means it is possible to create colors in the decrypted image which were not present in the encrypted image, and to cause parts of the image to 'drop out' by causing the overlap region to produce the same color as the surrounding background.

Additive color multiplexed images can be used to produce full color images from encrypted image zones which contain color separations for the image. Printed images are normally produced using a subtractive color system based on cyan, yellow, magenta, and black inks. Additive color separations are printed in red, green, blue, and black inks.

Additive color processing can also be applied to unconventional color image formation, such as the production of a spectrum of colors from superimposed red and white images, in accordance with the Retinex theory of color vision proposed by Edwin H. Land. In this method, two black-and-white photographs are made of a colored subject. One of the photographs is taken through a red color filter and the other photograph is taken through a green filter. These images may be used to create the perception of a full color image by printing the 'red' image as a red halftone and the 'green' image as a white or green halftone. The white image and the red image are printed on a black background in positions that allow visual superposition by a multiplexing optic.

FIG. 17 illustrates the Eschergram method of image encryption. Eschergrams were named in honor of the great artist M. C. Escher, who transformed the mathematical process of tessellation into an art form. This encryption method relies on the regular division of the original image into interlocking shapes which usually form a repeating pattern. The superimposition of the final image on this Escheresque pattern alters the shapes of the individual interlocking shapes, resulting in the original tesselated Eschergram image 56. The superposition of the original image on the tessellation pattern can be thought of as punching holes through the tessellation pattern. The modified tessellation shapes are then distributed into linearly displaced zones to form the encrypted Eschergram image 57. The distribution of shapes into the encrypted image may be in an ordered manner, as by placing all shapes of identical orientation into a image zone, or in a more random manner by mixing shapes of different orientations in each of the image zones images. It is desirable to match the symmetry order of the Eschergram tessellation pattern to the multiplexing function of the decrypting optic. The encrypted Eschergram image 57 of FIG. 17 was designed for use with a three image linear multiplexer.

Multiple image brightness levels can be produced in a decrypted monochrome multiplexed image by the controlled overlap of image areas. For the case of a three image multiplexing optic, four brightness levels are possible with a monotonal encrypted image. Assuming the image is presented on a dark background, the absence of any image components converged to a region will produce the dark background color. One image converged to an area yields the next level of brightness, two images the next, and three images the brightest. This technique can be used to create bright outlines to detail images, to provide shading, and to add visual emphasis.

In addition to the methods of color control taught above, another method called Spectral Coloring can produce brilliant colors from black and white images. In this method a chromatically dispersive multiplexing optic can be used to spread image components into their spectra. The spectra can be caused to overlap to greater or lesser degrees, producing color patterns in the overlap regions. Using this technique it is possible to generate brilliant 'electric' colors from black and white patterns. A repeating pattern of parallel black and white bars can produce a wide range of spectral colors from the overlapping spectra produced by the chromatic dispersion of the white image lines. Varying the diffraction angle of the optic or the distance of the optic to the pattern will alter the resulting colors. Further control of the colors produced can be gained by the use of colored regions other than 'simple' black and white patterns.

Figure 18B:
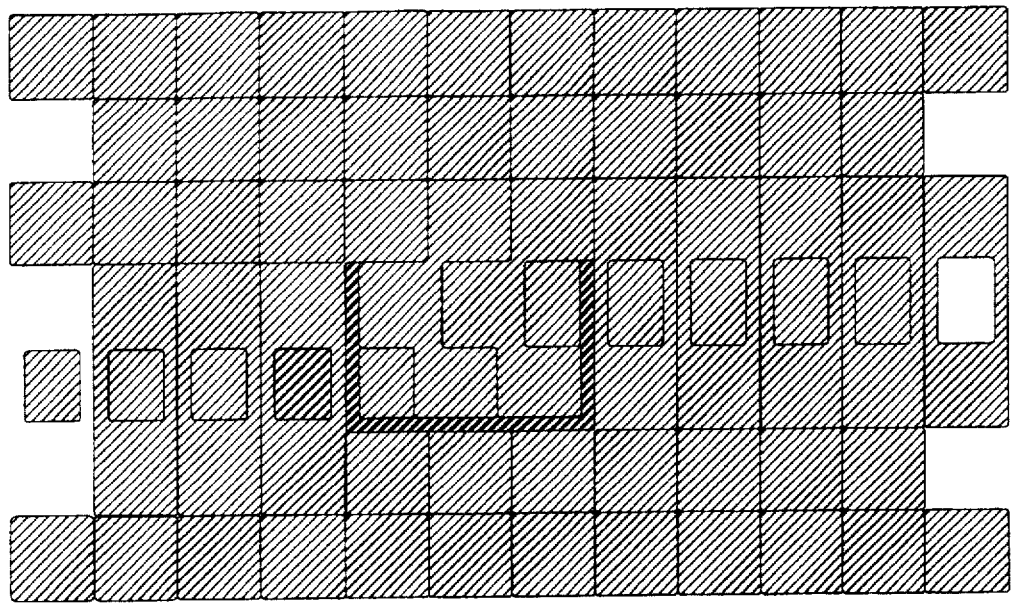
FIG. 18 depicts an image encrypted by the Self-Keyed encryption method and its decrypted form.
Figure 18A:
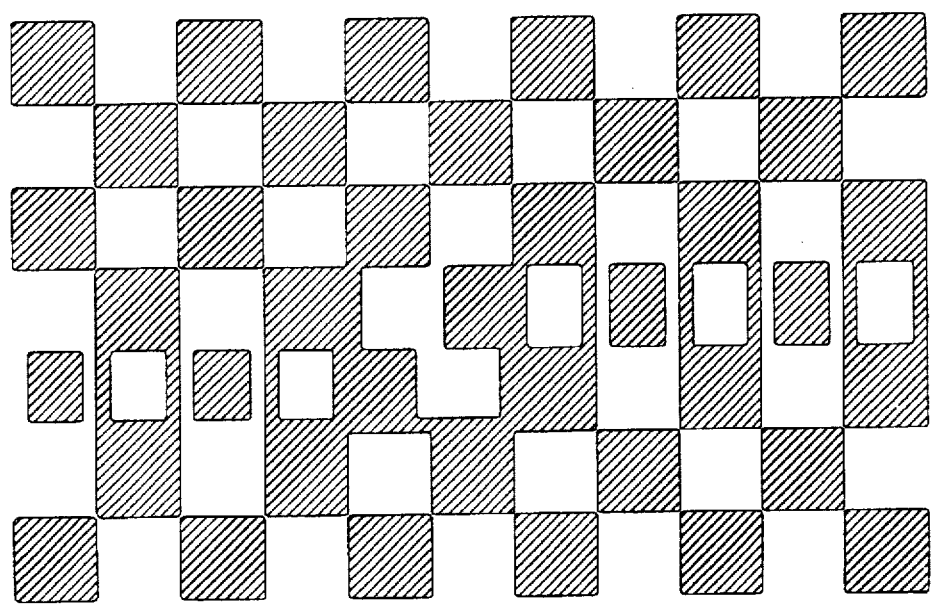

FIG. 18 illustrates the Self-Keyed image encryption method. In this method the image is encrypted into a pattern which can be decrypted by the addition of a key image. The encrypted image is also the key image, so the image is self-keying. The key image results from the displacement and/or rotation of the encrypted image. In the case illustrated in FIG. 18 the key image is obtained by displacing the Self-Keyed encrypted image 58 upwards by one unit-square of the checkerboard pattern. If the shaded area of the Self-Keyed encrypted image 58 is printed in red, for example, against a black background, it may be decrypted by means of a two image multiplexing optic. The decrypting optic produces the key image from the self-keyed encrypted image 58 by displacing an image of it upward by one unit-square. The optical superposition of the encrypted image and its key result in the creation of the decrypted Self-Keyed image 59 displaying the letter 'C' as a bright red image against a dim red background. If the colors of the Self-Keyed encrypted image 58 are reversed, so the shaded regions are colored black and the white areas are printed in red, for example, the decrypted image 59 will display a black 'C' against a red background. Both bright foreground images and black images can be produced in the same decrypted image. Although the example depicted in FIG. 18 utilizes a simple one-square displacement of the encrypted image to produce the decryption key, a different displacement pattern may be employed to create the key from the encrypted image. For example, the displacement between the encrypted image and its key may be in a 'knight's move', i.e. by one horizontal square of translation to the right plus one square diagonally upward to the right. A larger displacement of the key spreads the image information throughout a larger area of the encrypted image, increasing the security of the image information. The Self-Keyed encrypted image may take other forms besides the 'checkerboard pattern' shown in FIG. 18, so long as the principle of Self-keying is maintained.

EXAMPLE

Beverage Bottle Label Game Piece

Figure 19A:
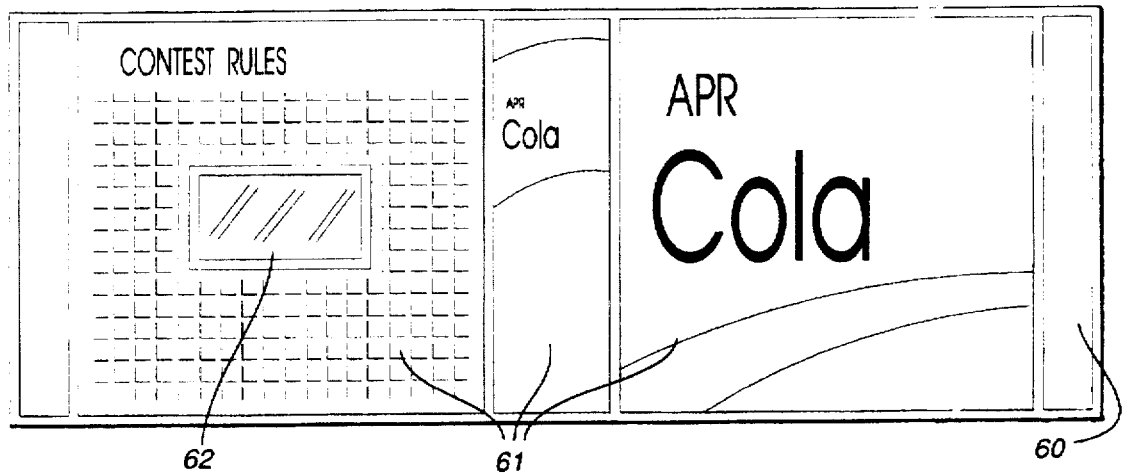
FIG. 19 depicts both sides of a bottle label incorporating an encrypted image and a decrypting optic.
Figure 19B:
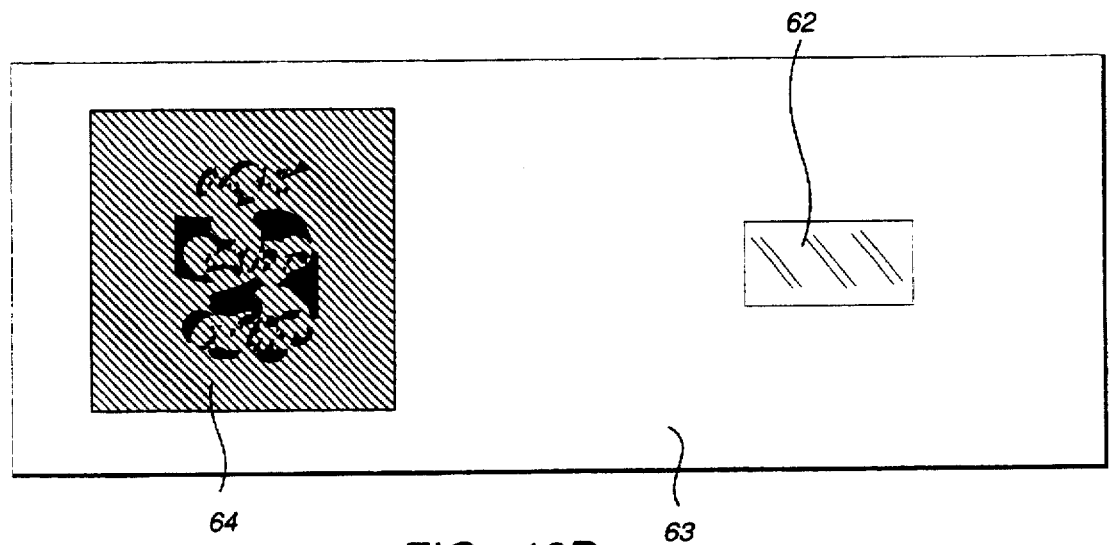

A promotional game piece for incorporation into the label of a transparent beverage bottle is illustrated in FIG. 19. The outer face of the bottle label 60 includes printed areas 61 and at least one transparent optic window 62 which remains substantially unprinted. The inner face of the bottle label 63 includes the transparent optic window 62 and the printed encrypted image 64. The placement of the printed encrypted image 64 is such that it lies opposite the transparent optic window 62 when the label is wrapped around and secured to the transparent bottle.

Figure 20:
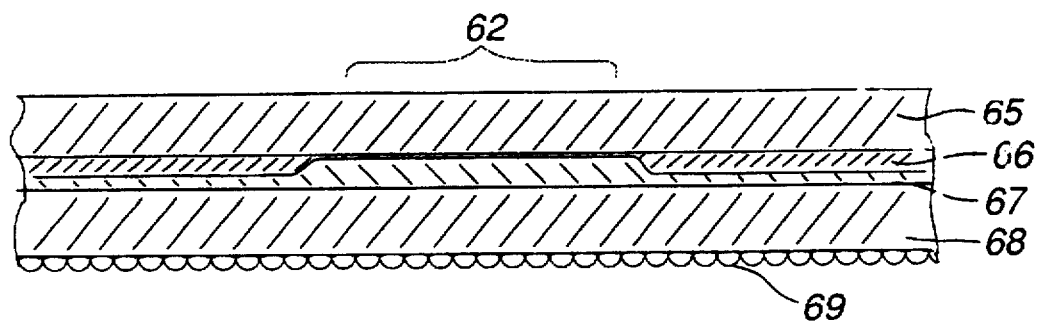
FIG. 20 depicts a typical bottle label structure.

FIG. 20 illustrates a preferred embodiment of the bottle label structure. It consists of a transparent plastic film 65 printed with ink 66 and laminated with transparent adhesive 67 to a second transparent plastic film 68. The multiplexing optic takes the form of a hologram 69 which is embossed onto the outer surface of the second plastic film 68. At least one region of the plastic film 65 does not bear ink so that a transparent optic window 62 enables light to pass through the label and the embossed hologram 69.

Figure 21:
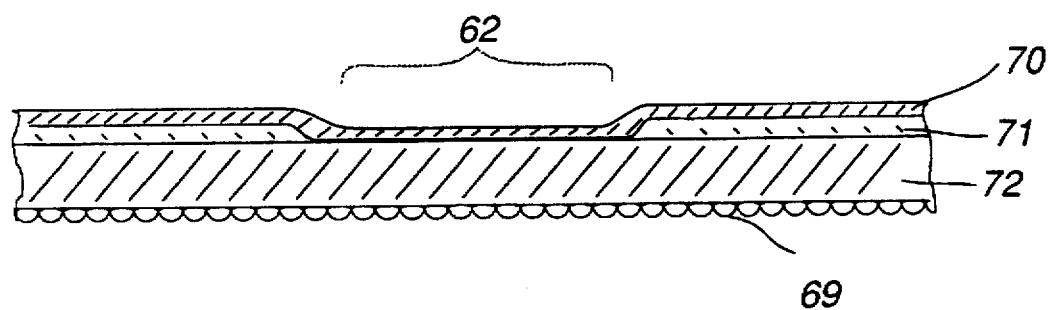
FIG. 21 depicts an alternative bottle label structure.

An alternative label structure is illustrated in FIG. 21 which eliminates one layer of plastic and a lamination step. It consists of a transparent plastic film 72 bearing an ink 71 image. The ink 71 is protected from abrasion by a transparent protective coating 70. The multiplexing optic hologram 69 is embossed into the other surface of the plastic film 72. At least one region of the label does not bear ink, thereby forming the transparent optic window 62.

Figure 22:
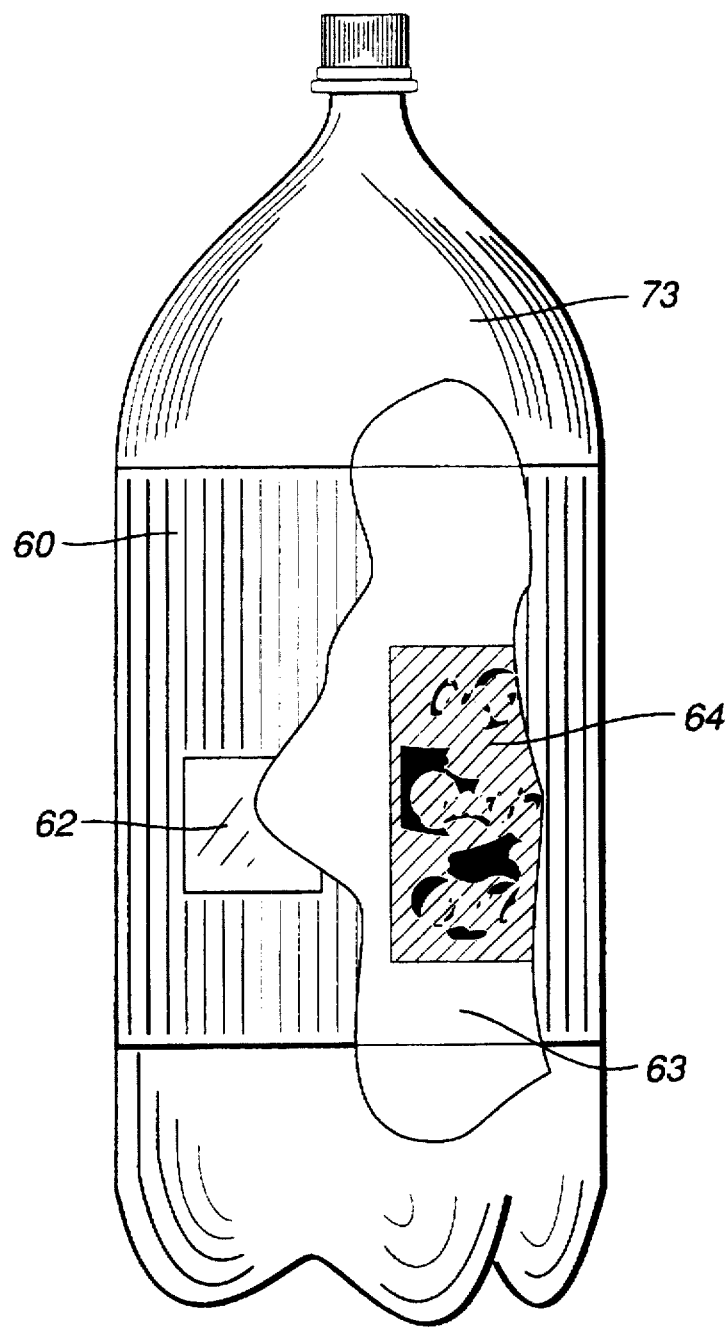
FIG. 22 is a cutaway view of a bottle bearing the label of FIG. 19.

FIG. 22 illustrates the application of the promotional bottle label. The label of FIG. 19 is wrapped around a substantially transparent bottle 73 such that the outer face of the bottle label 60 is not in contact with the bottle and the inner face of the bottle label 63 is in contact with the bottle. The printed encrypted image 64 then lies diametrically opposite the transparent optical window 62. When the encrypted image 64 is viewed by looking over or under the label, it remains encrypted. Viewing the encrypted image 64 by looking through the transparent optic window 62 enables its decryption by the multiplexing optic embossed hologram 69.

This embodiment exhibits a high level of security, since the image cannot be decrypted until the bottle is purchased and its contents removed. The image cannot be decrypted while the bottle is full of liquid, regardless of the opacity or transparency of the liquid. All liquids possess a higher refractive index than air, and the presence of a liquid between the encrypted image and the decrypting optic prevents decryption by altering the effective multiplexing angles. Alternatively, the image can be designed to be decrypted when liquid fills the bottle and to remain encrypted when the bottle is empty, or to decrypt to form one image when the bottle contains liquid and a different image when the bottle is empty. The encrypted image cannot be decrypted by removing the label from the bottle and placing the decrypting optic in contact with the encrypted image because the distance between the optic and the encrypted image must be substantially equal to the diameter of the bottle for decryption to occur.

Promotional game pieces need to enable the random incorporation of winning game pieces among the vast majority of non-winning game pieces. The bottle label provides several methods for accomplishing this by altering the printed encrypted image 64, the embossed hologram 69, or both. These alterations enable the creation of different decrypted images which indicate whether the purchaser has won a particular prize.

If the encrypted images are varied to produce different decrypted images with the same decrypting optic, it is generally preferred to encrypt the images by a method which yields encrypted images of very similar appearance. The White Holes, Eschergram, Self-keyed, and Scattergram image encryption methods are particularly well suited to this application.

If the decryption optics are varied to produce different decrypted images from a single encrypted image, the single encrypted image must incorporate the patterns of all of the images which are to be decrypted. Selection of the particular decrypted image which is to be seen is accomplished by altering the rotational or translational orientation of the decrypting optic, by altering its distance from the encrypted image, or by altering the optical function of the decrypting optic. A simple example of this approach was provided above in FIG. 13.

It is clear that these two approaches, altering the encrypted image and altering the decrypting optic, may be combined if desired.

In addition to the methods of image encryption taught above, this invention may be further expanded to allow the incorporation of holographic images into the decrypting optic. The decrypting optic would therefore perform two optical functions: multiplexing the encrypted image to enable its decryption and the visual reconstruction of a holographic image. The holographic image may be subsidiary to the encrypted image, not directly affecting the decryption of the image, or may be an essential part of the decryption process. The holographic image itself may include essential elements of the decrypted image which are omitted from the printed encrypted image. The combination of the multiplexed decryption of the encrypted image with the holographic image information provides the complete decryption of the image.

Production of an encrypted image may be accomplished by hand drafting, by computer aided design methods, or by an optical projection method. When hand drafting and computer aided design methods are employed, the placement of original image fragments into specific zones of the encrypted image is determined by mathematical calculation and by geometrical analysis. In some cases it is desirable to employ the decrypting optics themselves to accomplish this task, as when the decrypting optic and the encrypted image are not disposed in parallel planes. In these cases the original image is first divided into the sets of image fragments which will occupy chosen regions of the encrypted image. Each set of image fragments is then separately projected through the decrypting optic onto the surface which will bear the encrypted image. The multiplexing optic will produce multiple images on the encrypted image surface. The position and shape of the image fragments in one of the encrypted image zones is then recorded by photographic means, by hand tracing, or by any other convenient method. This process is repeated for the remaining sets of image fragments, resulting in a predistorted encrypted image. Viewing the predistorted encrypted image by means of the decrypting optic reverses the distortions, resulting in a substantially geometrically correct decrypted image.

Although the examples provided in this teaching incorporate multiplexing optics which operate in transmission, this invention is not limited to transmission optics. The multiplexing optics can alternatively be designed to operate in reflection, in combination with the necessary and obvious alterations of the optical arrangements.

Other aspects and applications of the invention will be apparent to those of ordinary skill in the art. The invention therefore is not intended to be limited to the preferred embodiments described herein, but rather is defined by the claims and equivalents thereof.

What is claimed is:

1. A method for encrypting and decrypting graphic displays comprising:

creating a spatially encrypted graphic display by dividing an original graphic display into a plurality of graphic display fragment zones through application of one or more image alteration methods to said original graphic display and by positioning said fragment zones into a substantially planar display in a substantially single plane; and providing a decrypting optic having a plurality of light multiplexing zones; and decrypting said spatially encrypted graphic display to visually reconstruct said original graphic display by viewing said spatially encrypted graphic display through said decrypting optic, wherein said decrypting optic substantially reverses the encryption by optically superimposing the graphic display fragment zones to create an overlap zone to which each of said graphic display fragment zones contribute at least one set of image fragments, and wherein said decrypting optic comprises a layer of substantially transparent substrate material having a surface relief pattern formed therein for directing light passing through said optic in a plurality of directions, and wherein said surface pattern comprises a plurality of prismatic zones.

2. A method for encrypting and decrypting graphic displays comprising the steps of:

selecting an optical function for a decrypting optic;

creating a spatially encrypted graphic display by dividing an original graphic display into a plurality of graphic display fragment zones by altering the original graphic display in a manner dictated by said optical function and by positioning said fragment zones into a planar display wherein said fragment zones are placed in a substantially single plane; and providing a decrypting optic having a plurality of light multiplexing zones; and decrypting said spatially encrypted graphic display to visually reconstruct said original graphic display by viewing the encrypted graphic display through said decrypting optic, wherein said decrypting optic substantially reverses the encryption by optically superimposing the graphic display fragment zones to create an overlap zone to which each of said graphic display fragment zones contribute at least one set of image fragments, and wherein said decrypting optic comprises a layer of substantially transparent substrate material having a surface relief pattern formed therein for directing light passing through said optic in a plurality of directions, and wherein said surface pattern comprises a plurality of prismatic zones.

3. A method for encrypting and decrypting graphic displays comprising the steps of:

selecting an optical function for a decrypting optic;

creating a spatially encrypted graphic display by operating on an original graphic display with said decrypting optic to divide said original graphic display into a plurality of graphic display fragment zones and by positioning said fragment zones into a substantially planar display wherein said fragment zones are placed in a substantially single plane; and providing a decrypting optic having a plurality of light multiplexing zones; and decrypting said spatially encrypted graphic display to visually reconstruct said original graphic display by viewing said spatially encrypted graphic display through said decrypting optic, wherein said decrypting optic substantially reverses the encryption by optically superimposing the graphic display fragment zones to create an overlap zone to which each of said graphic display fragment zones contribute at least one set of image fragments, and wherein said decrypting optic comprises a layer of substantially transparent substrate material having a surface relief pattern formed therein for directing light passing through said optic in a plurality of directions, and wherein said surface pattern comprises a plurality of prismatic zones.

4. A method for encrypting and decrypting graphic displays comprising the steps of:

creating a spatially encrypted graphic display by dividing an original graphic display into a plurality of graphic display fragment zones through application of one or more image alteration methods to said original graphic display, the alteration methods being selected from the group consisting of geometric distortion, segmentation and displacement of image components, chromatic distortion, and chromatic segmentation and by positioning said fragment zones into a substantially planar display wherein said fragment zones are placed in a substantially single plane;

providing a decrypting optic having a plurality of light multiplexing zones; and decrypting said spatially encrypted graphic display to visually reconstruct said original graphic display by viewing said spatially encrypted graphic display through said decrypting optic, wherein said decrypting optic substantially reverses the encryption by optically superimposing the graphic display fragment zones to create an overlap zone to which each of said graphic display fragment zones contribute at least one set of image fragments, and wherein said decrypting optic comprises a layer of substantially transparent substrate material having a surface relief pattern formed therein for directing light passing through said optic in a plurality of directions, and wherein said surface pattern comprises a plurality of prismatic zones.

5. The method of claims 1, 2, 3 or 4 in which said decrypting optic is a compound optic consisting of two or more optical elements arranged in series.

6. The method of claims 1, 2 or 3 in which said decrypting optic incorporates both a multiplexing defraction pattern and a holographic image.

7. The method of claim 4, said method combining two or more visual patterns into said encrypted graphic display such that each of said patterns is reconstructable by different rotational orientations of said decrypting optic, by different separation distances between the spatially encrypted graphic display and said decrypting optic, or by providing said decrypting optic with a plurality of zones wherein said zones may have different optical functions.

8. The method of claims 1, 2, 3 or 4 in which said spatially encrypted graphic display and said decrypting optic are incorporated into a bottle label.

9. The method of claims 1, 2, 3 or 4 wherein the method is applied to promotional gaming applications.

10. The method of claims 1, 2, 3 or 4 wherein said decrypting optic is defractive in nature.

11. The method of claim 10 wherein said diffractive optic has a groove design which is optimized to substantially equalize optical energy distribution into selected diffractive orders and to substantially suppress the presence of other diffractive orders.

12. The method of claims 1, 2, 3 or 4 wherein said decrypting optic is refractive in nature.

13. The method of claims 1, 2, 3 or 4 wherein said decrypting optic is both refractive and defractive in nature.

14. The method of claims 1, 2, 3 or 4 wherein the method is applied to document security or document verification applications.

15. The method of claim 4 wherein said one or more image alteration methods include a method of dividing the original graphic display into a plurality of graphic display fragment zones by dividing the original graphic display into geometric elements and separating the geometric elements into two or more zones.

16. The method of claim 4 wherein said one or more image alteration methods include a method of dividing the original graphic display into a plurality of graphic display fragment zones by dividing the original graphic display along false lines of continuity to form image fragments and spacially separating the image fragments into two or more zones.

17. The method of claim 4 wherein said one or more image alteration methods include a method of dividing the original graphic display into a plurality of graphic display fragment zones by dividing a background of the original graphic display into fragments which can be decrypted to form different reconstructed images.

18. The method of claim 4 wherein said one or more image alteration methods include a method of dividing the original graphic display into a plurality of graphic display fragment zones by creating a plurality of image fragments comprised of pixels which are turned on or off and spacially separating the image fragments such that the encrypted image forms a continuous pattern of seemingly random pixels.

19. The method of claim 4 wherein said one or more image alterations methods include a method of dividing the original the graphic display into a plurality of graphic display fragment zones by dividing the original graphic display into a plurality of maze patterns, wherein each maze pattern is printed in a particular color and wherein when the graphic display fragment zones are overlapped, certain colors add while other colors cancel out.

20. The method of claim 4 wherein said one or more image alterations methods include a method of dividing the original graphic display into a plurality of graphic display fragment zones by dividing the original graphic display into interlocking shapes and spacially separating sets of the interlocking shapes into fragment zones such that when the fragment zones are optically superimposed, the encrypted graphic display is decrypted.

21. The method of claim 4 wherein said one or more image alterations methods include a method of dividing the original graphic display into a plurality of graphic display fragment zones by superimposing the original graphic display onto itself but spacially offset by a predetermined amount so that the displays are not in perfect alignment and wherein the decrypting optic decrypts the encrypted graphic display by optically realigning the graphic displays.

22. The method of claim 4 wherein said one or more image alteration methods include additive color processing.

23. The method of claim 4 wherein said one or more image alteration methods include controlled overlap of various encrypted image components to create the appearance of different tones in said visual reconstruction of said original graphic display.

24. The method of claim 4 wherein said one or more alteration methods include chromatic dispersion to produce or alter color in said visual reconstruction of said original graphic display.

25. The method of claim 4 wherein said decrypting optic is of substantially radial design.

26. The method of claim 4 wherein said decrypting optic incorporates two or more zones each having different multiplexing functions.

* * * * *